US009830638B2

(12) United States Patent
Ruckart et al.

(10) Patent No.: US 9,830,638 B2
(45) Date of Patent: Nov. 28, 2017

(54) MANAGING VENDOR INVENTORY INFORMATION AND SHOPPING NAVIGATION ROUTES BASED UPON SHOPPING LIST CONTENTS

(71) Applicant: AT&T Intellectual Property I, L.P., Atlanta, GA (US)

(72) Inventors: John P. Ruckart, Atlanta, GA (US); Giuseppe Di Fabbrizio, Florham Park, NJ (US); Amanda Joy Stent, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 264 days.

(21) Appl. No.: 13/690,525

(22) Filed: Nov. 30, 2012

(65) Prior Publication Data
US 2014/0156450 A1    Jun. 5, 2014

(51) Int. Cl.
*G06Q 30/00*    (2012.01)
*G06Q 30/06*    (2012.01)

(52) U.S. Cl.
CPC ..... *G06Q 30/0633* (2013.01); *G06Q 30/0639* (2013.01)

(58) Field of Classification Search
CPC ............. G06Q 30/0633; G06Q 10/087; G06Q 30/0281; G06Q 30/0261; G06Q 30/0639
USPC .............................. 705/26.1, 26.8, 26.9, 27.1
See application file for complete search history.

(56) References Cited

U.S. PATENT DOCUMENTS

| | | | | |
|---|---|---|---|---|
| 2002/0174021 A1* | 11/2002 | Chu | ..................... | G06Q 10/063 705/7.11 |
| 2003/0229898 A1* | 12/2003 | Babu | ..................... | G06Q 30/02 725/87 |
| 2004/0093274 A1* | 5/2004 | Vanska | .................. | G01C 21/20 705/26.7 |
| 2006/0265294 A1* | 11/2006 | de Sylva | ............ | G06Q 30/0603 705/28 |
| 2007/0150369 A1* | 6/2007 | Zivin | .............................. | 705/26 |
| 2009/0239552 A1 | 9/2009 | Churchill et al. | | |

(Continued)

OTHER PUBLICATIONS

Anonymous, "Back-To-School Shopping with Slifter Saves Time, Money and Gas", Aug. 14, 2008, PR Newswire Association LLC.*

(Continued)

*Primary Examiner* — Alexis Casey
*Assistant Examiner* — Brittany Bargeon
(74) *Attorney, Agent, or Firm* — Hartman & Citrin LLC

(57) ABSTRACT

Concepts and technologies are disclosed herein for managing vendor inventory information and shopping navigation routes based upon shopping list contents. A server computer can execute a shopping management service. A shopping list is obtained at the server computer. The server computer obtains location data indicating a geographic location of the user device and identifies, based upon the location data, a vendor having an inventory comprising the item. The server computer generates a navigation route comprising a stop at a vendor location associated with the vendor, and provides the navigation route to the user device. The server computer can monitor purchases of items on the shopping list, update the shopping list, and update the navigation route. The server computer also can provide suggestions to the user device based upon items in the shopping list.

17 Claims, 16 Drawing Sheets

(56) References Cited

U.S. PATENT DOCUMENTS

| | | | | |
|---|---|---|---|---|
| 2011/0225068 | A1* | 9/2011 | Figueroa | G06F 17/30241 705/27.1 |
| 2012/0123674 | A1* | 5/2012 | Perks | G09B 29/007 701/426 |
| 2013/0325320 | A1* | 12/2013 | Dimitriadis | G01C 21/3415 701/414 |
| 2014/0019230 | A1* | 1/2014 | Lawson | G06Q 30/02 705/14.45 |

OTHER PUBLICATIONS

FiveFly, Google Play, Android Apps, <https://play.google.com/store/apps/details?id=com.fivefly.android.shoppinglist&feature=search_result#?t=W251bGwsMSwyLDEsImNvbS5maXZlZmx5LmFuZHJvaW-Quc2hvcHBpbmdsaXN0XN0II0.> [Retrieved on Oct. 24, 2012], 3 pages.

Cozi, <http://www.cozi.com/> [Retrieved on Oct. 24, 2012], 3 pages.

Grocery Gadget, <https://itunes.apple.com/us/app/grocery-gadget-shopping-list/id287932487?mt=8> [Retrieved on Oct. 24, 2012], 3 pages.

Grocery IQ, <http://www.groceryiq.com/Default.aspx?home=true> [Retrieved on Oct. 24, 2012], 2 pages.

SnapAR, Inc, StoreAlertz, <http://www.androidpit.com/en/android/market/apps/app/com.snapar.storealertz/StoreAlertz>, [Retrieved on Oct. 24, 2012], 4 pages.

Shopping List, <http://www.iphoneshoplist.com/>, [Retrieved on Oct. 24, 2012], 3 pages.

ErrandTracker, <http://www.errandtracker.com/index/take-a-tour>, [Retrieved on Oct. 24, 2012], 1 page.

Achtzener, Kevin, "Will a GPS Based Errand List Help You Get More Done?," <http://youremakingme.com/will-a-gps-based-errand-list-help-you-get-more-done/>, May 14, 2012, 5 pages.

MobSav, <http://www.mobsav.com/>, [Retrieved on Oct. 24, 2012], 2 pages.

Yowza!! <http://www.getyowza.com/>, [Retrieved on Oct. 24, 2012], 2 pages.

Butcher, Dan, "Google bets on location-based mobile coupons as linchpin for success", <http://www.mobilemarketer.com/cms/news/search/7850.html>, Oct. 22, 2010, 6 pages.

Van Grove, Jennifer, "Find and Redeem Location-Based Coupons on Your iPhone or Android," <http://mashable.com/2010/09/18/shooger> Sep. 18, 2010, 21 pages.

* cited by examiner

MANAGING VENDOR INVENTORY INFORMATION AND SHOPPING NAVIGATION ROUTES BASED UPON SHOPPING LIST CONTENTS

BACKGROUND

This application relates generally to a shopper marking platform. More particularly, the disclosure provided herein relates to managing vendor inventory information and shopping navigation routes based upon shopping list contents.

Over the past several years, the use of smartphones and other portable Internet-enabled devices has increased drastically. Thus, many consumers today rely upon smartphones or other portable computer devices to track appointments, interact with messaging applications and/or other functionality, make phone calls, or the like. Some smartphones include reminder lists, or the like, for tracking tasks and/or generating reminders at specific times and/or locations.

Some users rely upon reminders and/or other applications executing on portable computing devices to provide shopping list functionality. As such, a user entering a store or other location may retrieve a shopping list stored at the phone or at a remote data storage location in an attempt to remember the items on the shopping list. As items are purchased, a user may delete the reminder dedicated to the item purchased and/or may otherwise remove the item from the list.

SUMMARY

The present disclosure is directed to managing vendor inventory information and shopping navigation routes based upon shopping list contents. A server computer can execute a shopping management service that can receive a shopping list generated at a user device and/or generated at other devices and shared with the user device. The shopping management service can obtain location data associated with the user device and determine, based upon the location data, a number of vendors at which items of the shopping list can be obtained. The vendors can be selected based upon a defined search area associated with the geographic location of the user device, included in a vendor list, specified by a user, and/or otherwise determined by the shopping management service.

The shopping management service can select each item in the shopping list and search inventories of the vendors identified by the shopping management service. In some embodiments, the inventories can be searched by accessing shared or published inventories, for example, via application programming interfaces exposed by one or more computing systems associated with the vendors. In some other embodiments, the shopping management service can be configured to assume inventories of the vendors based upon rules, models, algorithms, functions, historical purchases/scans, and/or known inventory information. Thus, for vendors whose inventories are not publically available, the shopping management service can be configured to assume or estimate inventories. For each item in the shopping list, the shopping management service can identify a vendor with a real inventory including the item and/or an assumed inventory including the item.

The shopping management service can assign each item of the shopping list to an identified vendor having the item in their inventory, and repeat until each item in the shopping list is assigned to a vendor. After identifying the vendors at which a user will shop to obtain the items in the shopping list, the shopping management service can generate a navigation route for the shopping excursion. The navigation route can be optimized based upon various routing constraints such as, for example, a number of stops, a total distance, a total trip time, a total cost of the items, a preferred vendor list, a preferred road list, planned future location, or the like. The navigation route can be generated and navigation data defining the navigation route can be sent to the user device.

The shopping management service also can manage the navigation route and/or the shopping list in response to detecting purchases of items, for example items on the shopping list. A user can scan a barcode of an item purchased during a shopping excursion and the user device can transmit the scanned or otherwise obtained data associated with a purchased item to the shopping management service. The shopping management service can remove the item from the list and determine if the navigation route is to be changed in response to removing the item from the list. In some embodiments, the shopping management service also can update inventory data associated with the vendor at which the item was purchased. For example, if the item was assumed to be available at the vendor location and later detected as having been purchased there, the shopping management service can update the inventory data to reflect a heightened probability that the item is available at that vendor.

The shopping management service also can generate suggestions for a shopping list based upon items on the shopping list and inventories of vendors. Suggestions for items on the list can be generated based upon a user's or users' purchase histories and/or trends, and the vendors associated with the shopping list can be searched to determine if the vendors' inventories include the identified suggestions. If so, the suggestions can be pushed to the user device. If not, or if the user device determines that a user or other entity has declined the suggestion, the suggestion can be ignored. If the user device determines that the user or other entity has adopted the suggestion, the shopping list can be updated.

According to one aspect of the concepts and technologies disclosed herein a method is disclosed. The method can include obtaining, at a server computer executing a shopping management service, a shopping list associated with a user device. The shopping list can include an item. The method also can include obtaining, by the server computer, location data indicating a geographic location of the user device, identifying by the server computer, based upon the location data, a vendor having an inventory including the item, and generating, by the server computer, a navigation route including a stop at a vendor location associated with the vendor. The method also can include providing, by the server computer, the navigation route to the user device.

In some embodiments, identifying the vendor having the inventory including the item can include searching the inventory via an application programming interface exposed by a computing device associated with the vendor. In some embodiments, identifying the vendor having the inventory including the item can include identifying the vendor based upon the geographic location and assuming contents of the inventory include the item based upon a rule. Assuming the contents can include determining a probabilistic certainty with which the vendor is assumed to have the inventory including the item and determining that the probabilistic certainty exceeds a threshold certainty. In some embodiments, the shopping list can include two or more items, which can include the item, and identifying the vendor can include identifying, for an item of the plurality of items, a vendor having an associated inventory that includes the item of the plurality of items.

In some embodiments, identifying the vendor can include identifying two or more vendors, and the stop can include two or more stops corresponding to locations of the two or more vendors. The method also can include receiving data indicating that the item has been purchased, removing the item from the shopping list, determining if the navigation route is to be changed based upon removing the item from the shopping list, and in response to a determination that the navigation route is to be changed, generating a navigation route update, and sending the navigation route update to the user device. In some embodiments, the method also can include receiving data indicating that the item was purchased, identifying a vendor at which the item was purchased, and updating inventory data associated with the vendor to indicate that the item was purchased. The method also can include identifying a suggestion including a further item determined to be related to the item, determining if the inventory can include the further item, and in response to a determination that the inventory can include the further item, transmitting data specifying the suggestion to the user device.

According to another aspect of the concepts and technologies disclosed herein, a system is disclosed. The system can include a processor and a memory storing computer-executable instructions. When the computer-executable instructions are executed by the processor, the processor can perform operations including obtaining a shopping list associated with a user device, the shopping list including an item, obtaining location data indicating a geographic location of the user device, identifying, based upon the location data, a vendor having an inventory including the item, generating a navigation route including a stop at a vendor location associated with the vendor, and providing the navigation route to the user device.

In some embodiments, the computer-executable instructions, when executed by the processor, can cause the processor to perform operations further including receiving data indicating that the item has been purchased, removing the item from the shopping list, determining if the navigation route is to be changed based upon removing the item from the shopping list, and in response to a determination that the navigation route is to be changed, generating a navigation route update, and sending the navigation route update to the user device. Identifying the vendor having the inventory including the item can include identifying the vendor based upon the geographic location and assuming contents of the inventory include the item based upon a rule.

In some embodiments, the computer-executable instructions, when executed by the processor, can cause the processor to perform operations further including receiving data indicating that the item was purchased, identifying a vendor at which the item was purchased, and updating inventory data associated with the vendor to indicate that the item was purchased. In some embodiments, the computer-executable instructions, when executed by the processor, can cause the processor to perform operations further including identifying a suggestion including a further item determined to be related to the item, determining if the inventory can include the further item, and in response to a determination that the inventory can include the further item, transmitting data specifying the suggestion to the user device. In some embodiments, the computer-executable instructions, when executed by the processor, can cause the processor to perform operations further including receiving data including an indication that the suggestions is to be added to the shopping list, and in response to receiving the data, updating the shopping list.

According to yet another aspect of the concepts and technologies disclosed herein, a computer storage medium is disclosed. The computer storage medium can have computer-executable instructions stored thereon. When the computer-executable instructions are executed by a processor, the processor can perform operations including obtaining a shopping list associated with a user device, the shopping list including an item, obtaining location data indicating a geographic location of the user device, identifying, based upon the location data, a vendor having an inventory including the item, generating a navigation route including a stop at a vendor location associated with the vendor, and providing the navigation route to the user device.

In some embodiments, the computer storage medium can include computer-executable instructions that, when executed by the processor, cause the processor to perform operations further including receiving data indicating that the item has been purchased, removing the item from the shopping list, determining if the navigation route is to be changed based upon removing the item from the shopping list, and in response to a determination that the navigation route is to be changed, generating a navigation route update, and sending the navigation route update to the user device. In some embodiments, the computer storage medium can include computer-executable instructions that, when executed by the processor, cause the processor to perform operations further including receiving data indicating that the item was purchased, identifying a vendor at which the item was purchased, and updating inventory data associated with the vendor to indicate that the item was purchased.

In some embodiments, the computer storage medium can include computer-executable instructions that, when executed by the processor, cause the processor to perform operations further including identifying a suggestion including a further item determined to be related to the item, determining if the inventory can include the further item, and in response to a determination that the inventory can include the further item, transmitting data specifying the suggestion to the user device. Identifying the vendor having the inventory including the item can include determining a probabilistic certainty with which the vendor is assumed to have the inventory including the item, and determining that the probabilistic certainty exceeds a threshold certainty.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
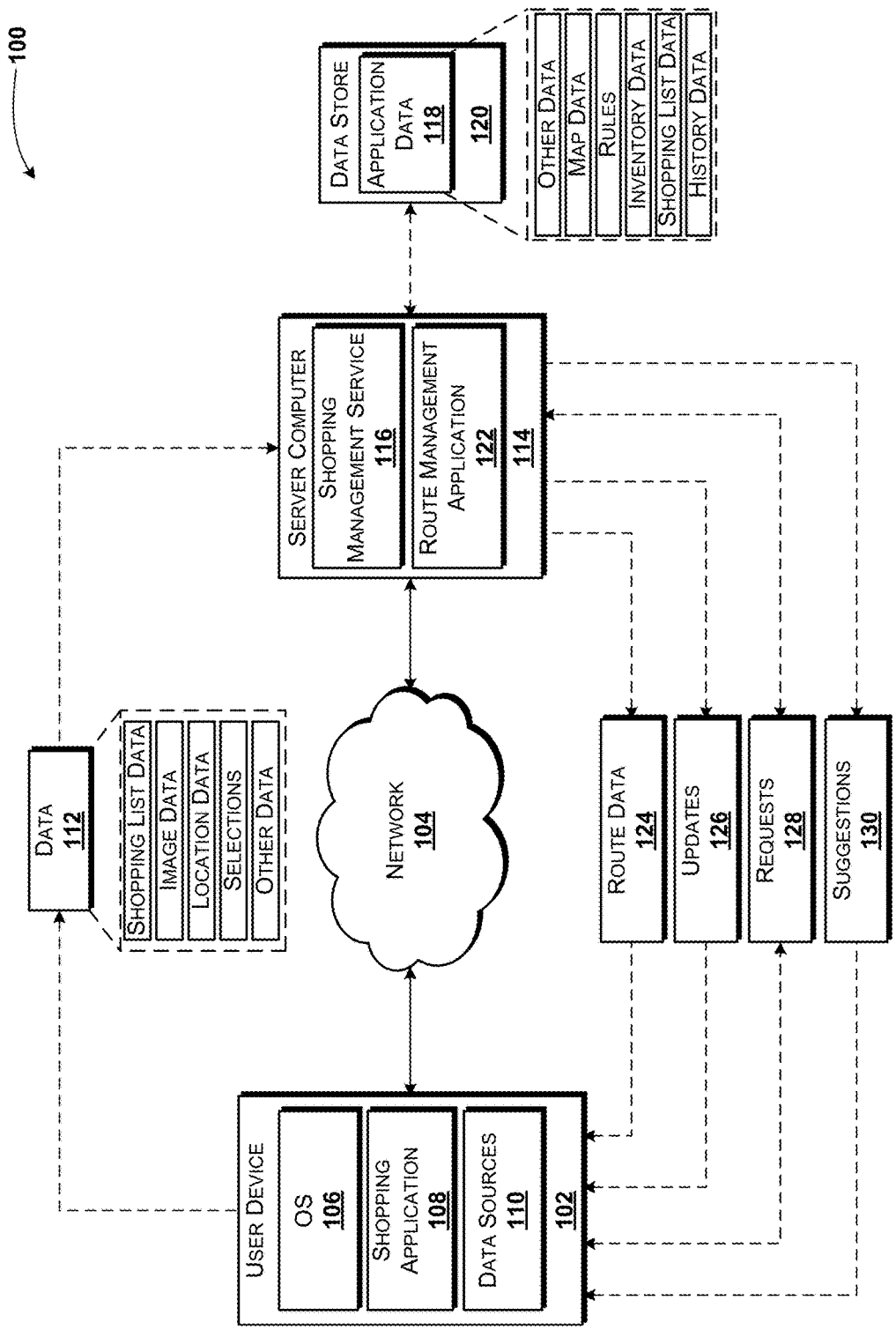
FIG. 1 is a system diagram illustrating an illustrative operating environment for the various embodiments disclosed herein.

The following detailed description is directed to managing vendor inventory information and shopping navigation routes based upon shopping list contents. A server computer can execute a shopping management service that can receive a shopping list. The shopping management service can determine, based upon location data defining a geographic location of a user device, a number of vendors. The shopping management service can search inventories of the vendors to identify vendors at which items of the shopping list can be obtained. The vendors also can be included in a vendor list stored at the user device or elsewhere, specified by a user or other entity, and/or otherwise determined by the shopping management service.

The shopping management service can, for each item in the shopping list, search inventories of the vendors identified by the shopping management service. For each item in the shopping list, the shopping management service can identify a vendor with a real inventory including the item and/or an assumed inventory including the item. The shopping management service can assign each item of the shopping list to an identified vendor having the item in their inventory. After identifying the vendors at which a user will shop to obtain the items in the shopping list, the shopping management service can generate a navigation route for the shopping excursion. The navigation route can be optimized based upon various routing constraints such as, for example, a number of stops, a total distance, a total trip time, a total cost of the items, a preferred vendor list, a preferred road list, or the like. The navigation route can be generated and navigation data defining the navigation route can be sent to the user device.

The shopping management service also can manage the navigation route and/or the shopping list in response to detecting purchases of items. A user can scan a barcode or other indicia associated with an item purchased by the user. The user device can transmit the scanned or otherwise obtained data associated with a purchased item to the shopping management service. The shopping management service can remove the item from the shopping list and determine if the navigation route is to be changed in response to removing the item from the list. In some embodiments, the shopping management service also can update inventory data associated with the vendor at which the item was purchased.

The shopping management service also can generate suggestions for a shopping list based upon items on the shopping list and inventories of vendors. Suggestions for items on the list can be generated based upon purchase histories, search histories, and/or trends, and the vendors associated with the shopping list can be searched to determine if vendor inventories of vendors associated with a shopping list include the identified suggestions. If so, the suggestions can be pushed to the user device. If not, or if the user device determines that a user or other entity has declined the suggestion, the suggestion can be ignored. If the user device determines that the user or other entity has adopted the suggestion, the shopping list can be updated.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for managing vendor inventory information and shopping navigation routes based upon shopping list contents. The operating environment 100 shown in FIG. 1 includes a user device 102. According to various embodiments, the functionality of the user device 102 can be provided by one or more mobile telephones, smartphones, or the like. The functionality of the user device 102 also can be provided by one or more personal computers ("PCs"), in-vehicle computing systems, server computers, tablet computers, laptop computers, set-top boxes, other computing systems, and the like. For purposes of describing the concepts and technologies disclosed herein, the user device 102 is described as a smartphone. It should be understood that this embodiment is illustrative, and should not be construed as being limiting in any way.

According to various embodiments, the user device 102 can be configured to operate in communication with and/or as part of a communications network ("network") 104. Additional details of the network 104 are discussed below with reference to FIG. 9. The user device 102 can execute an operating system 106 and one or more application programs such as a shopping application 108. The operating system 106 is a computer program for controlling the operation of the user device 102. The shopping application 108 is an executable program configured to execute on top of the operating system 106 to provide various functionality described herein for managing vendor inventory information and shopping navigation routes based upon shopping list contents.

According to various embodiments, the shopping application 108 can be configured to control and/or communicate with one or more data sources 110 located at and/or included in the user device 102 to obtain information used to provide the functionality described herein. The information obtained by the data sources 110 can include, but is not limited to, location information; time information; various operating and/or ambient conditions associated with the user device 102; images such as bar code scan images, product images, or the like; other information; combinations thereof; or the like. Thus, the data sources 110 can include various components of the user device 102 such as, for example, location components, communication components, imaging systems, sound systems, combinations thereof, or the like. These and other components of the user device 102 are illustrated and described in additional detail below with reference to FIG. 11.

The shopping application 108 also can be configured for interactions with a user or other entity to generate a shopping list, to scan items purchased during a shopping or errand trip or excursion ("shopping excursion"), to view and/or modify a navigation route for a shopping excursion (also referred to herein as a "shopping route"), to obtain location information, to obtain and/or present shopping list suggestions, combinations thereof, or the like. These and other functions of the shopping application 108 are described in additional detail below.

According to various embodiments, the shopping application 108 can include, or can be included as a part of, a natively executed application, a Web application, and/or another type of application. The shopping application 108 can be configured to collect data 112 and to provide the data 112 to various recipients such as the server computer 114 illustrated in FIG. 1. As noted above, the data 112 collected by the shopping application 108 can include, but is not limited to, shopping list data representing one or more shopping lists and/or items on the shopping lists; image data images such as photos, bar code scans, or the like; location data representing a geographic location of the user device 102 and/or a user associated with the user device 102; selection data representing selections made via user interfaces presented at the user device 102; other data; combinations thereof; or the like. The collection and use of these and other types of information included in the data 112 are described in additional detail herein.

According to various embodiments, the shopping application 108 can obtain a shopping list from a user or other entity associated with the user device 102, and/or can obtain a shopping list from a sharing user or sharing device. The shopping application 108 can provide the shopping list as the data 112 to a shopping management service 116 hosted by and/or executed at a computing device such as, for example, the server computer 114. Additionally, or alternatively, the user device 102 can provide the other types of the data 112 described herein to the shopping management service 116 for use in providing the functionality described herein for managing vendor inventory information and shopping navigation routes based upon shopping list contents.

The shopping management service 116 can be configured to receive the data 112, and to use and/or store the data 112. In some embodiments, the shopping management service 116 can be configured to store the data 112 and/or portions thereof as application data 118 in a data storage device such as a data store 120. The functionality of the data store 120 can be provided by one or more real or virtual resources including, but not limited to, databases, server computers, desktop computers, mobile telephones, laptop computers, other computing systems, and the like. In the illustrated embodiments, the functionality of the data store 120 is provided by a server computer storing a multi-tenant database. It should be understood that this embodiment is illustrative, and should not be construed as being limiting in any way.

The application data 118 can include various types of information and/or other data that can be obtained from the user device 102, other devices, and/or information or other data obtained from various sources accessible to the server computer 114 and/or the data store 120. In particular, the application data 118 can include history data, list data, inventory data, rules, map data, other data, combinations thereof, or the like. According to some implementations of the concepts and technologies disclosed herein, the application data 118 includes at least inventory data, rules, and map data. It should be understood that this embodiment is illustrative, and should not be construed as being limiting in any way.

The history data can represent histories associated with one or more users of the shopping management service 116. The history data can include, for example, information representing shopping and/or purchasing histories associated with one or more users, location and/or movement histories associated with one or more users, account history information associated with one or more users, other history information, combinations thereof, or the like. Thus, the history data can be obtained from a number of sources including, but not limited to, credit card processing companies, location based services ("LBS") servers, subscriber databases, and/or other sources.

The list data can represent shopping lists associated with one or more users of the shopping management service 116. The list data can include, for example, a shopping list, vendor information, time frame information, item information, pricing and/or review information, combinations thereof, or the like. According to various implementations of the concepts and technologies disclosed herein, the shopping management service 116 can be configured to obtain shopping list data in the data 112 from the user device 102, and to store the list data as a representation of the shopping list associated with the user of the user device 102. Thus, when the description herein refers to the shopping management service 116 as storing and/or using a shopping list associated with a user, it should be understood that the shopping management service 116 can obtain and/or use the list data stored at the data store 120.

The inventory data can represent inventories associated with vendors. Thus, the inventory data can correspond, in some embodiments, to a large collection of data that represents inventory information for a number of vendors. The inventory data can be stored, in some embodiments, in a separate data storage device and/or distributed storage device and updated based upon the data 112 received from the user device 102. The inventory data can include inventory information obtained from vendors who expose their inventories to users, for example, via an application programming interface ("API") for exploring a vendor's inventory, based upon assumptions and/or the rules shown in FIG. 1, based upon input received from the user device 102, combinations thereof, or the like. The updating of the inventory data is illustrated and described in additional detail herein, particularly with reference to FIG. 6.

Briefly, an inventory of a particular vendor identified by the shopping management service 116 can be based upon a known or shared inventory associated with the vendor. For example, some retailers may publish inventories and/or allow users or other entities to explore inventories via one or more APIs, and as such, inventories of these retailers may be known or shared. These inventories can be represented by the inventory data. Some vendors, however, do not publish or otherwise expose inventories to users. Some embodiments of the concepts and technologies disclosed herein include, as part of the application data 118, various rules and/or rule sets for estimating, projecting, and/or otherwise determining inventories of vendors who do not publish or otherwise expose inventories.

The rules can include algorithms, functions, statistical models, or the like, which can be used to assume an inventory of a particular vendor whose inventory is not publically available. For example, a convenience store at a particular location may not share its inventory. The rules may define that a convenience store of a particular size or type may be assumed, with a defined probability, to have a particular product. Thus, the rules can define products or product sets, probabilities of these products beings stocked and/or available at various types or categories of vendors, or the like. As will be explained in more detail herein, the data 112 obtained by the shopping management service 116 can be used to build and/or refine the inventory data, thereby allowing inventories for these and other types of vendors to be determined without accessing published or otherwise exposed inventory information.

The map data can include maps and various rules or algorithms for generating routes. Thus, the map data can be used to generate navigation directions between two or more geographic locations. According to various embodiments, the server computer 114 can host a route management application 122, which can be configured to generate route data 124 representing a navigation route or shopping route associated with a shopping list. The route data 124 can be optimized by the route management application 122 based upon items in one or more shopping lists, locations of vendors at or near the user device 102, inventories and/or assumed inventories of the vendors, or the like. Thus, the route management application 122 can be configured to generate a route for a user based upon his or her shopping list and vendors that are expected to have items on the shopping list. The route data 124 can be optimized by the route management application 122 based upon various considerations such as, for example, total time to obtain items on a shopping list, total distance to obtain items on the shopping list, total cost of obtaining items on the shopping list, combinations thereof, or the like.

The route management application 122 also can be configured to update the navigation routes represented by the route data 124 based upon the data 112 received by the server computer 114. The route management application 122 also can be configured to generate and/or send navigation route updates ("updates") 126 to the user device 102 to effect changes to the routes represented by the route data 124. Thus, for example, the route management application 122 can be configured to remove stops from a navigation route if an item to be purchased at the removed stop is purchased at another stop on the navigation route. These and other aspects of generating and/or updating navigation routes based upon shopping activity are illustrated and described in more detail below, particularly with reference to FIG. 5.

Although the shopping management service 116 and the route management application 122 are illustrated as components of the server computer 114, it should be understood that each of these components may be embodied as or in stand-alone devices or components operating as a part of and/or in communication with the network 104, the user device 102, and/or the server computer 114. As such, the illustrated embodiment should be understood as being illustrative of only some contemplated examples of the concepts and technologies disclosed herein and should not be construed as being limiting in any way.

The shopping management service 116 also can be configured to generate and provide shopping list suggestions ("suggestions") 130 to the user device 102. The suggestions 130 can be generated based upon one or more items in the shopping list and can correspond, according to various implementations, to items that sometimes or often are purchased with the item in the shopping list. The determination as to what items to suggest can be based upon, among other things, the rules, a purchase history associated with the user, combinations thereof, or the like. Generating the suggestions 130 will be illustrated and described in additional detail below, particularly with reference to FIG. 7.

According to various embodiments of the concepts and technologies disclosed herein, the user device 102 executes the shopping application 108. A user or other entity generates a shopping list at the user device 102 and/or at a device associated with the user device 102. As such, the shopping list can be generated at the user device 102 and/or at another device via which the shopping list can be shared with the user device 102. The user device 102 can provide the shopping list to the shopping management service 116 as the data 112. The data 112 also can include location information, user or device selections made at the user device 102, image data such as item scans during a shopping excursion and/or at other times, other information, and the like. The data 112 can be provided to the shopping management service 116 at various times during operations described herein.

The shopping management service 116 can be configured to determine, based upon the shopping list, one or more vendors to be visited during a shopping trip. The shopping management service 116 can be configured to obtain inventories associated with a number of vendors in the vicinity of the user device 102. In some embodiments, one or more of the vendors can be specified by a user of the user device 102 in the shopping list, in settings or preferences, and/or at other times. In other embodiments, the shopping management service 116 can determine, based upon the shopping list, location information, user histories, or the like, one or more vendors to be visited during the shopping trip.

The shopping management service 116 can include functionality associated with, and/or can invoke, a route management application 122 for generating a navigation route for a shopping excursion based upon the shopping list. The navigation route can be based upon one or more routing constraints and inventory information associated with the vendors. According to various embodiments, the inventory of the vendors can be published or otherwise exposed by the vendors and/or can be determined, by the shopping management service 116.

In particular, as mentioned above, the shopping management service can be configured to determine, based upon known attributes of a vendor location such as, for example, a size of the vendor location, association of the vendor location with a franchise and known attributes of the franchise, tax information, combinations thereof, or the like. Based upon these determined attributes, as well as models and/or algorithms for estimating, assuming, and/or determining a probability of a particular item being in stock at the vendor location, the shopping management service 116 can determine, with a particular probabilistic certainty, whether or not the vendor location will have an item in the shopping list. In some embodiments, the shopping management service 116 can determine the probabilistic certainty and compare the probabilistic certainty to a probability threshold. In some embodiments, the probability threshold can be specified by the user. In other embodiments, the probability threshold can be defined as being between 90% and 99.9999%. It should be understood that this embodiment is illustrative, and should not be construed as being limiting in any way. If the shopping management service 116 determines that the vendor is expected to have the item with a probabilistic certainty that satisfies a defined probability threshold, the vendor can be compared to other vendors and/or selected as a vendor location to be visited during a shopping excursion to obtain the item.

The shopping management service 116 can consider each item in the shopping list and identify a vendor at which each item is to be purchased or otherwise obtained during the shopping excursion. The route management application 122 can be provided with a vendor list that includes each vendor location to be visited, and the route management application 122 can generate a navigation route that can be optimized for a number of user considerations such as, for example, a number of stops, a trip time, a total distance, a cost of the shopping list items, other considerations, combinations thereof, or the like.

The determined navigation route for the shopping excursion can be represented by the route data 124 and transmitted to the user device 102. The shopping application 108 can provide a route display showing the navigation route. As items are purchased during the shopping excursion, the user or other entity can scan a barcode or other indicia associated with the items, and the barcode or other data can be included in the data 112 described above. The user device 102 can transmit the data 112 to the shopping management service 116, and the shopping management service 116 can update the shopping list associated with the user. If a purchased item renders one or more stops of the shopping excursion unneeded, the shopping management service 116 can again invoke or call the route management application 122, and a new navigation route can be generated. Updates for the shopping list displayed at the user device 102, as well as the navigation route displayed at the user device 102, can be provided to the user device 102 as the updates 126. Thus, as items are purchased, the shopping management service 116 can update a shopping list and/or a navigation route and push updates 126 to the user device 102 to reflect the changes. As will be explained in more detail below, the server computer 114 can receive the shopping list from the user device 102 in response to requesting the shopping list from the user device 102, for example via one or more requests 128.

FIG. 1 illustrates one user device 102, one network 104, one server computer 114, and one data store 120. It should be understood, however, that various implementations of the operating environment 100 include multiple user devices 102, multiple networks 104, multiple server computers 114, and/or multiple data stores 120. As such, the illustrated embodiment should be understood as being illustrative, and should not be construed as being limiting in any way.

Figure 2:
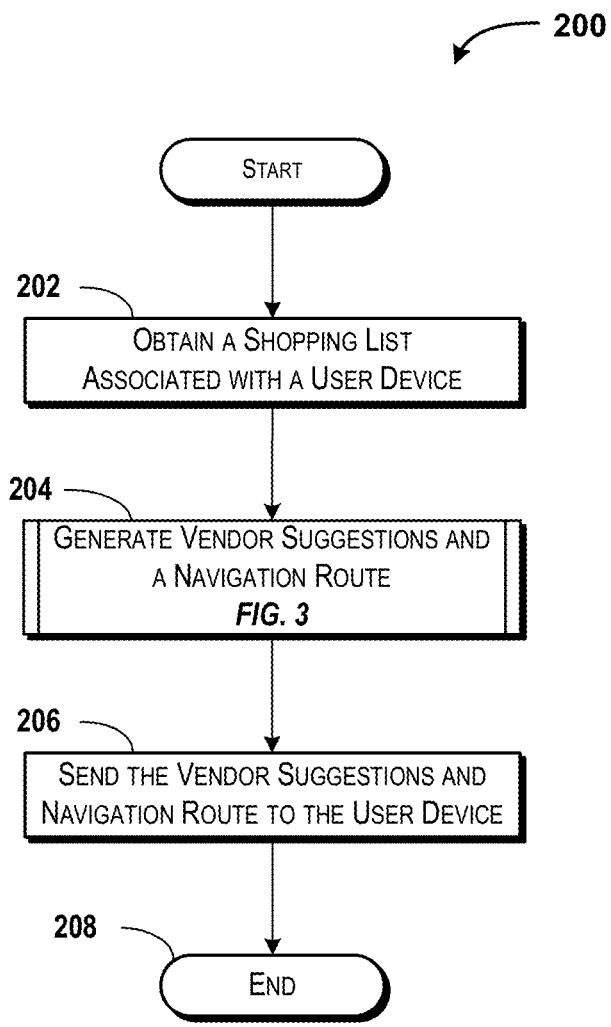
FIG. 2 is a flow diagram showing aspects of a method for generating a route based upon a shopping list, according to an illustrative embodiment.

Turning now to FIG. 2, aspects of a method 200 for generating a route based upon a shopping list will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 114 to perform one or more operations and/or causing the processor to direct other components of the computing system or device to perform one or more of the operations.

For purposes of illustrating and describing the concepts of the present disclosure, the methods disclosed herein are described as being performed by the server computer 114 via execution of one or more software modules such as, for example, the shopping management service 116 and/or the route management application 122. It should be understood that additional and/or alternative devices and/or network nodes can provide the functionality described herein via execution of one or more modules, applications, and/or other software including, but not limited to, the shopping management service 116 and/or the route management application 122. Thus, the illustrated embodiments are illustrative, and should not be viewed as being limiting in any way.

The method 200 begins at operation 202, wherein the server computer 114 receives a shopping list from a user device 102. According to various embodiments, the server computer 114 can obtain the shopping list by receiving a shopping list as the data 112 from the user device 102. In some other embodiments, the server computer 114 can receive the shopping list from the user device 102 in response to requesting the shopping list from the user device 102, for example via one or more requests 128. It should be understood that the shopping list can be shared with the user device 102 by other devices and/or users, as explained above.

From operation 202, the method 200 proceeds to operation 204, wherein the server computer 114 generates one or more vendor suggestions and/or a navigation route based upon the shopping list. Additional details of generating vendor suggestions and/or a navigation route are illustrated and described in additional detail herein, particularly with reference to FIGS. 3-4. Briefly, the server computer 114 can be configured to identify, for a particular item on the shopping list received in operation 202, a vendor that is known or assumed to include the item in its inventory. Upon identifying a vendor for each of the items on the shopping list, the server computer 114 can be configured to generate a navigation route that optimizes a shopping or errand list based upon the inventories, locations, and/or cost of the items at the vendors, as well as other considerations as explained herein.

From operation 204, the method 200 proceeds to operation 206, wherein the server computer 114 sends the vendor suggestions and/or the navigation route generated in operation 204 to the user device 102. It can be appreciated from the description of FIG. 1 above that the vendor suggestions and/or navigation route can be provided to the user device 102 as the route data 124 and/or the suggestions 130 illustrated and described herein. As such, the server computer 114 can obtain a shopping list, identify one or more vendors for items on the shopping list, and generate a navigation route associated with the shopping list and/or vendor suggestions to the user device 102.

From operation 206, the method 200 proceeds to operation 208. The method 200 ends at operation 208.

Figure 3:
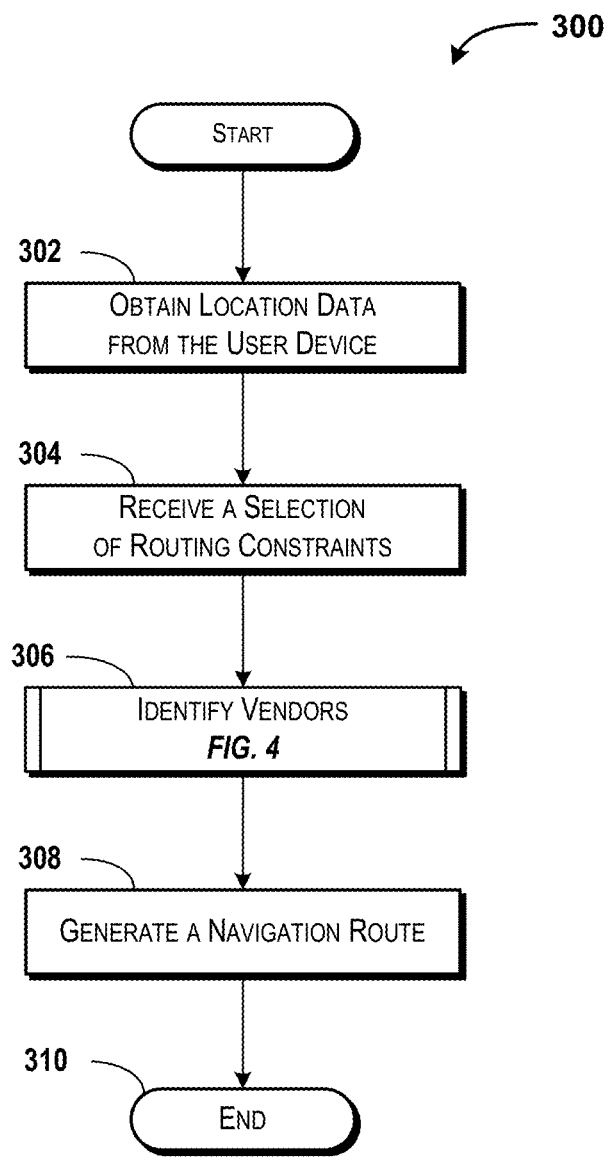
FIG. 3 is a flow diagram showing aspects of a method for generating vendor suggestions and/or a navigation route, according to another illustrative embodiment.

Turning now to FIG. 3, aspects of a method 300 for generating vendor suggestions and/or a navigation route will be described in detail, according to an illustrative embodiment. It should be understood that the functionality described herein with respect to FIG. 3 can, but is not necessarily, executed by the server computer 114 in accordance with execution of the operation 204 described above with reference to FIG. 2. Because the server computer 114 can execute the method 300 at additional and/or alternative times, it should be understood that this embodiment is illustrative, and should not be construed as being limiting in any way.

The method 300 begins at operation 302, wherein the server computer 114 obtains location data from the user device 102. The location data obtained in operation 302 can include, but is not limited to, a geographic location of the user device 102. The geographic location of the user device 102 can be obtained, for example, by a location server that obtains geographic location information using global positioning system ("GPS") technologies, A-GPS technologies, network connection information such as towers supporting the user device 102 at a particular time, triangulation information, wireless networking information such as service set identifiers ("SSIDs") of WIFI networks local to the user device 102, combinations thereof, or the like. In some embodiments, the functionality of the location server can be provided by an application or server operating as a part of and/or in communication with the server computer 114.

From operation 302, the method 300 proceeds to operation 304, wherein the server computer 114 receives a selection of one or more routing methods, approaches, preferences, or other constraints ("routing constraints") from the user device 102. In particular, the user device 102 can be configured to obtain one or more requests 128 from the server computer 114, wherein the requests 128 can include data for prompting for a routing constraint, among other things.

Some contemplated routing constraints include, but are not limited to, minimizing total distance of a shopping excursion, minimizing total time of the shopping excursion, minimizing a total number of stops on the shopping excursion, minimizing an expected or known cost of the shopping excursion, using only vendors with confirmed inventories (and avoiding assumed or expected inventories as described herein), using a maximum number of coupons, using preferred vendors of the user, other constraints, combinations thereof, or the like. An example UI for prompting a user for constraints to be used as the routing method in operation 304 is illustrated and described below with reference to FIG. 8E. Thus, operation 304 can include generating one or more requests 128 to obtain a selection or indication of one or more routing constraints and receiving, from the user device 102, the selection or indication of the one or more routing constraints as the data 112. It should be understood that this embodiment is illustrative, and should not be construed as being limiting in any way.

From operation 304, the method 300 proceeds to operation 306, wherein the server computer 114 identifies vendors for each of the one or more items included in the shopping list obtained in operation 202. The identification and/or selection of the vendors in operation 306 can be based, at least partially, upon the one or more routing constraints received in operation 304. Thus, for example, the server computer 114 can consider vendors with verified inventories, preferred vendors, or the like. If the one or more routing constraints do not apply to the type and/or selection of the vendors, the identification of the vendors in operation 306 may not be based upon the routing constraints received in operation 304. Additional details of identifying vendors for items of the shopping list are illustrated and described below with reference to FIG. 4.

From operation 306, the method 300 proceeds to operation 308, wherein the server computer 114 generates a navigation route. The server computer 114 can generate the navigation route based upon the routing constraints received in operation 304. Thus, for example, the server computer 114 can be configured to minimize a number of stops, to minimize an amount of time, minimize a total distance, and/or take other considerations into account as described herein. Thus, the server computer 114 can be configured, via execution of the method 300, to generate a navigation route to obtain items of a shopping list, wherein the navigation route can be optimized for user-specified routing constraints. Although not separately shown in FIG. 3, the server computer 114 can generate data such as the route data 124 and provide the route data 124 to the user device 102.

From operation 308, the method 300 proceeds to operation 310. The method 300 ends at operation 310.

Figure 4:
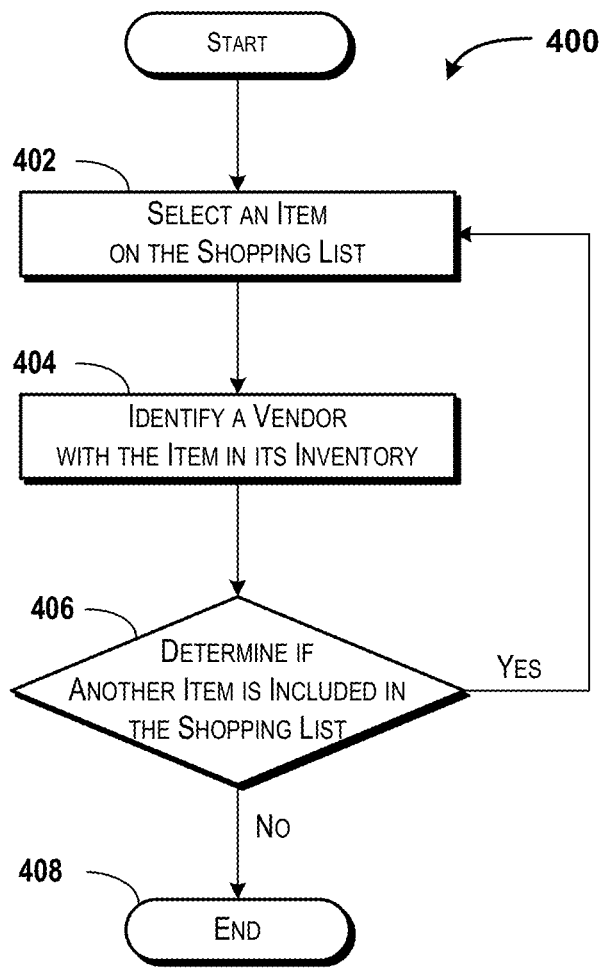
FIG. 4 is a flow diagram showing aspects of a method for identifying vendors for items of a shopping list, according to another illustrative embodiment.

Turning now to FIG. 4, aspects of a method 400 for identifying vendors for items of a shopping list will be described in detail, according to an illustrative embodiment. It should be understood that the functionality described herein with respect to FIG. 4 can, but is not necessarily, executed by the server computer 114 in accordance with execution of the operation 306 described above with reference to FIG. 3. Because the server computer 114 can execute the method 400 at additional and/or alternative times, it should be understood that this embodiment is illustrative, and should not be construed as being limiting in any way.

The method 400 begins at operation 402, wherein the server computer 114 selects an item on a shopping list. According to various embodiments, the shopping list from which the item is selected in operation 402 can correspond to the shopping list obtained by the server computer 114 in operation 202 of the method 200. In operation 402, the server computer 114 can select an item included on the shopping list. Items on the shopping list can be selected in alphabetical order, in order in which the items are included in the shopping list, an order of importance, an order of cost, and/or in other orders. Selection of the item in operation 402 also can be completed randomly, wherein the server computer 114 can select any item from the list for consideration.

From operation 402, the method 400 proceeds to operation 404, wherein the server computer 114 can identify a vendor that has the item selected in operation 402 in its inventory. According to various embodiments, the server computer 114 can identify a number of vendors in a geographic area associated with the user device 102. For example, the server computer 114 can identify a one mile radius, a ten mile radius, or the like, from a determined geographic location of the user device 102 as a search area and identify vendors in the search area. The size of the search area can be varied according to the rules stored as the application data 118, among other considerations. Thus, some geographic areas such as metropolitan areas may have a search area that is smaller in size than a search area defined for a suburban or unpopulated area.

In some embodiments, the server computer 114 can identify a closest number of vendors to the user device 102. Thus, for example, the server computer 114 may identify the ten closest vendors to the user device 102, the twenty closest vendors, the fifty closest vendors, or the like. After identifying a search area and/or a number of vendors, the server computer 114 can access an inventory associated with each of the identified vendors. The inventories can be actual inventories or expected, probable, estimated, or assumed inventories.

In particular, some vendors may expose or publish inventory information on the web or via other methods. A vendor such as WAL-MART, for example, may expose an API via which the shopping management service 116 can access and search an inventory associated with WAL-MART. Some other vendors, for example some convenience stores, small businesses, or the like may or may not expose or publish inventories. According to various embodiments of the concepts and technologies disclosed herein, the shopping management service 116 can be configured to estimate or assume inventories associated with these vendors.

The rules described herein can include classification information for classifying vendors based upon known or public record information such as business entity types, association with a franchise, distances from other vendors, classification of the vendor in directories, online ratings, or the like. The rules also can include algorithms and/or functions for specifying probabilities of certain types of items and/or specific items being available at various vendors. These rules can be accessed by the shopping management service 116 to determine a probability with which the vendor is expected to have the item selected in operation 402. Over time, the probabilities can be replaced with actual inventory information obtained by users who share purchase histories with the shopping management service 116.

As such, some embodiments, of the concepts and technologies disclosed herein enable a shopping management service 116 to obtain inventory information for small businesses and/or other entities that do not publish inventories, thereby improving the inventory data stored by and/or used by the shopping management service 116. Some businesses may be persuaded to advertise coupons, push suggestions, and/or generate other promotions via which traffic can be driven to their locations to build and/or improve the inventory data stored by the shopping management service 116. Thus, the shopping management service 116 can, in operation 404, search a number of vendors to determine if any of the vendors have the item selected in operation 402 in their inventories via accessing a real inventory and/or via accessing probabilistic models of inventories.

From operation 404, the method 400 proceeds to operation 406, wherein the server computer 114 determines if another item is included in the shopping list. If the server computer 114 determines that the shopping list includes another item, the method 400 can return to operation 402, wherein the server computer 114 can select another item on the shopping list and identify a vendor for the other item. Thus, it can be appreciated that the server computer 114 can repeat operations 402-406 of the method 400 until the server computer 114 determines, in any iteration of operation 406, that another item is not included in the shopping list.

If the sever computer 114 determines, in operation 406, that another item is not included in the shopping list, the method 400 proceeds to operation 408. The method 400 ends at operation 408. As such, it can be appreciated that the server computer 114 can consider each item of a shopping list and identify a vendor that has or is expected to have the item. Thus, by executing the method 400 described herein, each item of a shopping list can be considered and a vendor or other source at which to purchase or otherwise obtain the item can be determined by the server computer 114.

Figure 5:
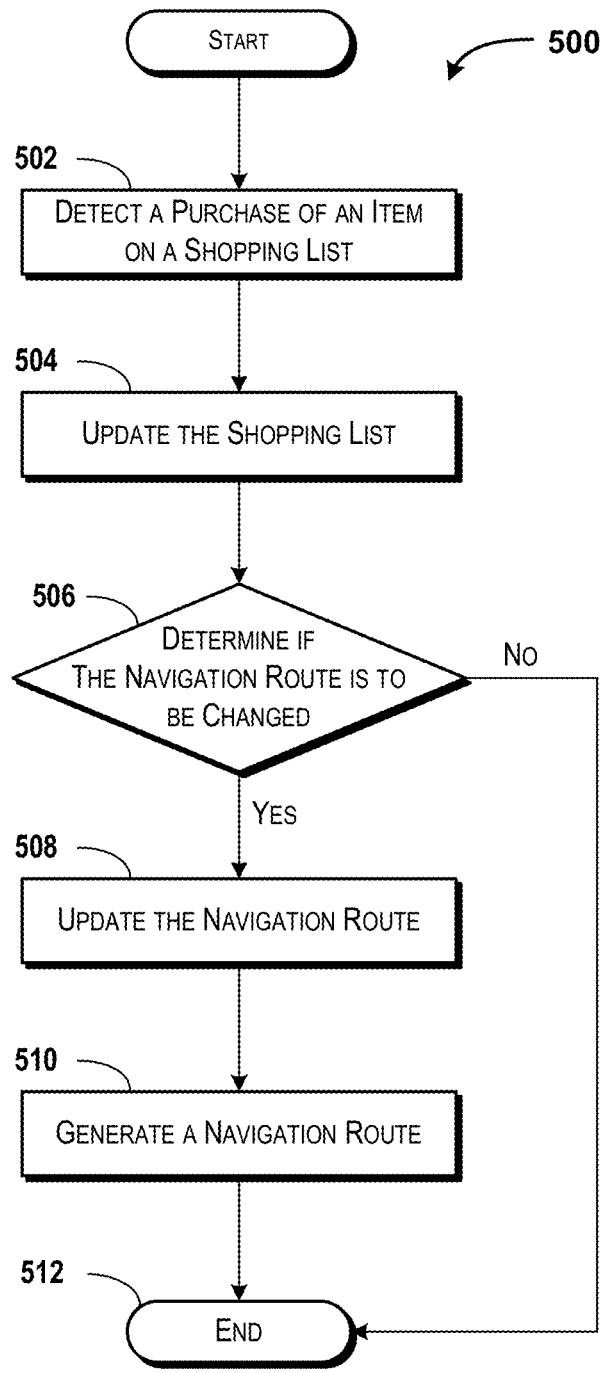
FIG. 5 is a flow diagram showing aspects of a method for updating a navigation route based upon shopping list updates, according to another illustrative embodiment.

Turning now to FIG. 5, aspects of a method 500 for updating a navigation route based upon shopping list updates will be described in detail, according to an illustrative embodiment. The method 500 begins at operation 502, wherein the server computer 114 detects a purchase of an item on a shopping list associated with a user. According to various embodiments, the server computer 114 can receive the data 112, which can correspond to a barcode capture image, text describing a purchased item, or the like. In some other embodiments, a user can grant the server computer 114 access to a purchase history of the user, and the server computer 114 can determine, in operation 502, that an item on a shopping list has been purchased by the user.

According to various embodiments of the concepts and technologies disclosed herein, operation 502 can correspond to the server computer 114 receiving a scan of a barcode and/or other image data, or an indication that a particular product or item on a shopping list has been purchased by a user. In light of the above descriptions of other ways in which the server computer 114 can determine that an item on a shopping list has been purchased, it should be understood that this embodiment is illustrative, and should not be construed as being limiting in any way.

From operation 502, the method 500 proceeds to operation 504, wherein the server computer 114 updates the shopping list. The server computer 114 can identify the item purchased in operation 502, and remove the item from a shopping list. If for any reason multiple instances of the item were on the shopping list and only one instance of the item is detected as being purchased in operation 502, the server computer 114 can update the list to reflect a reduction in a number of that item on the shopping list.

From operation 504, the method 500 proceeds to operation 506, wherein the server computer 114 determines if the navigation route is to be changed. In particular, the server computer 114 can determine if the navigation route associated with the shopping list is to be changed based upon the update to the shopping list described above with reference to operation 504. If a vendor was to be visited for an item, and if that item was purchased and therefore removed from the list, the server computer 114 can be configured to remove the vendor from the shopping list and/or the associated navigation route. As such, it can be appreciated that the server computer 114 can update a navigation route based upon detecting purchases of items and/or otherwise determining that a planned stop is now obsolete.

In some embodiments, the server computer 114 may generate instructions for prompting a user to specify whether the navigation route is to be updated, notwithstanding the assumption explained above that a particular stop may be obsolete. Thus, the server computer 114 can generate a request 128 and/or other instructions for asking a user if the navigation route is to be recalculated. An example of a UI for prompting a user to specify if a navigation route is to be recalculated based upon a shopping list update is illustrated and described below with reference to FIG. 8F.

If the server computer 114 determines, in operation 506, that the navigation route is to be changed, the method 500 proceeds to operation 508. In operation 508, the server computer 114 can update the navigation route. For example, the server computer 114 can remove a stop, reorder stops, and/or otherwise modify the navigation route. An example of presenting an updated navigation route at the user device is illustrated and described below with reference to FIG. 8D.

From operation 508, the method 500 proceeds to operation 510, wherein the server computer 114 generates a navigation route update. In some embodiments, though not shown in FIG. 5, the server computer 114 can send the navigation route update to the user device 102 and/or trigger other applications, systems, or devices to send the navigation route update to the user device 102. In some embodiments, the navigation route update generated in operation 510 can correspond to one or more of the updates 126 shown in FIG. 1.

From operation 510, the method 500 proceeds to operation 512. The method 500 also can proceed to operation 512 from operation 506, if the server computer 114 determines in operation 506 that the navigation route is not to be changed in response to the shopping list update. The method 500 ends at operation 514.

Figure 6:
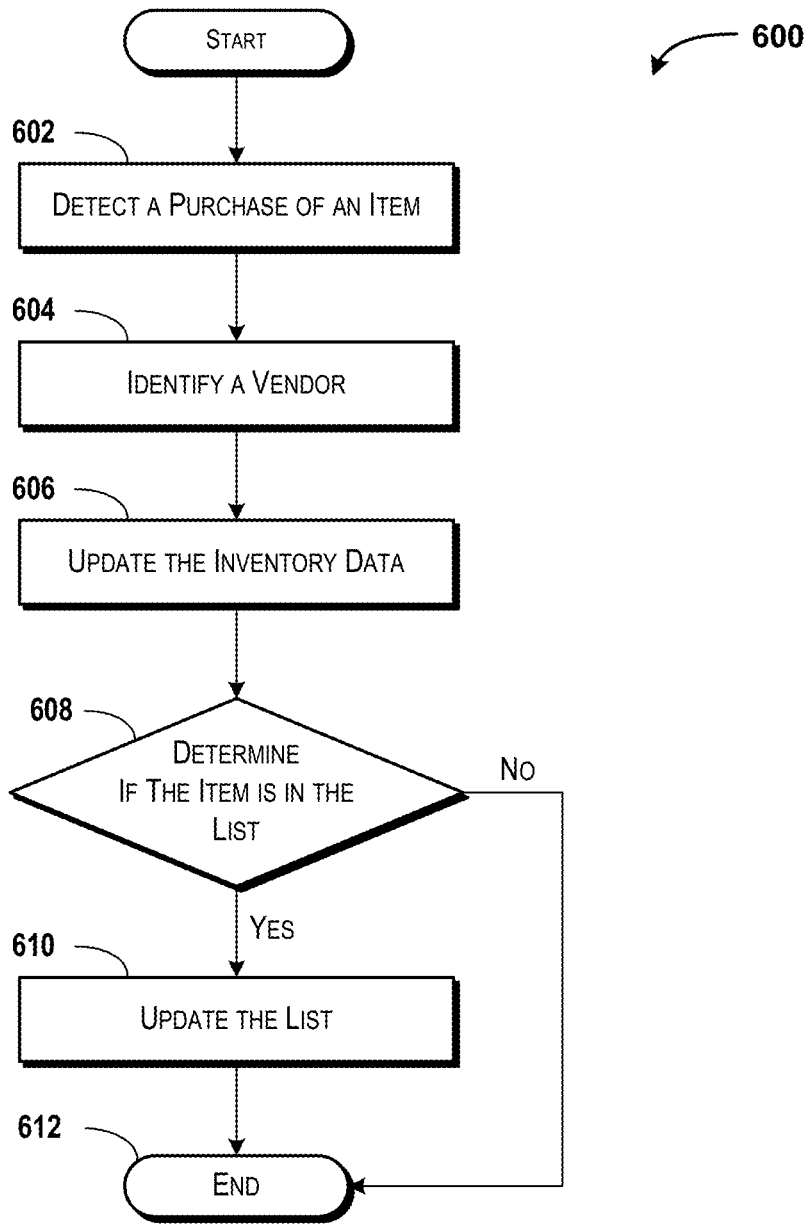
FIG. 6 is a flow diagram showing aspects of a method for updating a vendor inventory, according to another illustrative embodiment.

Turning now to FIG. 6, aspects of a method 600 for updating a vendor inventory will be described in detail, according to an illustrative embodiment. The method 600 begins at operation 602, wherein the server computer 114 detects a purchase of an item. It should be understood that that the functionality of the server computer 114 in operation 602 can be, but is not necessarily, similar or even identical to the functionality described above with reference to operation 502. It should be understood that the item detected as being purchased in operation 602 can be, but is not necessarily, on a shopping list.

From operation 602, the method 600 proceeds to operation 604, wherein the server computer 114 identifies a vendor at which the item was purchased as detected in operation 602. According to various embodiments, the server computer 114 can obtain location information associated with the user device 102 and determine a vendor at the determined location. Thus, operation 604 can include requesting and obtaining location information from the user device 102, and determining, based upon the geographic location represented by the location data, a vendor at which the purchase was made. It should be understood that the server computer 114 can use knowledge of the navigation route and/or associated vendor list to determine an identity of the vendor, if desired.

If for any reason the location indicated by the location information is ambiguous, e.g., if two or more vendors could correspond to the location information, the server computer 114 can be configured to prompt a user for an indication of the vendor and/or to share a purchase history to allow the server computer 114 to determine the vendor's identity.

Because the identity of the vendor can be determined in other ways (e.g., location beacons at the vendor location, SSIDs, GPS technologies, combinations thereof, or the like), it should be understood that these embodiments are illustrative, and should not be construed as being limiting in any way.

From operation 604, the method 600 proceeds to operation 606, wherein the server computer 114 updates the inventory data associated with the vendor identified in operation 604. Thus, for example, if the inventory of the vendor was not known and/or was estimated or assumed, the server computer 114 can be configured to update the inventory data and/or one or more rules to reflect that the item is now certainly in the inventory of the vendor. Thus, the server computer 114 can be configured to update inventory data and/or rules for determining inventory based upon purchases by users.

From operation 606, the method 600 proceeds to operation 608, wherein the server computer 114 can determine if the item is in a shopping list. As noted above, the item purchased in operation 602 may or may not be included in a shopping list. Thus, the server computer 114 can be configured to update the shopping list at operations 608-610 if the item purchased in operation 602 is determined to be in the shopping list.

If the server computer 114 determines, in operation 608, that the item is in the shopping list, the method 600 proceeds to operation 610. In operation 610, the server computer 114 can update the shopping list. Because the server computer 114 may be configured not to check a shopping list, it should be understood that operations 608-610 can be omitted in various embodiments of the concepts and technologies disclosed herein.

From operation 610, the method 600 proceeds to operation 612. The method 600 also can proceed to operation 612 if the server computer 114 determines, in operation 608, that the item is not in the shopping list. The method 600 ends at operation 614.

Figure 7:
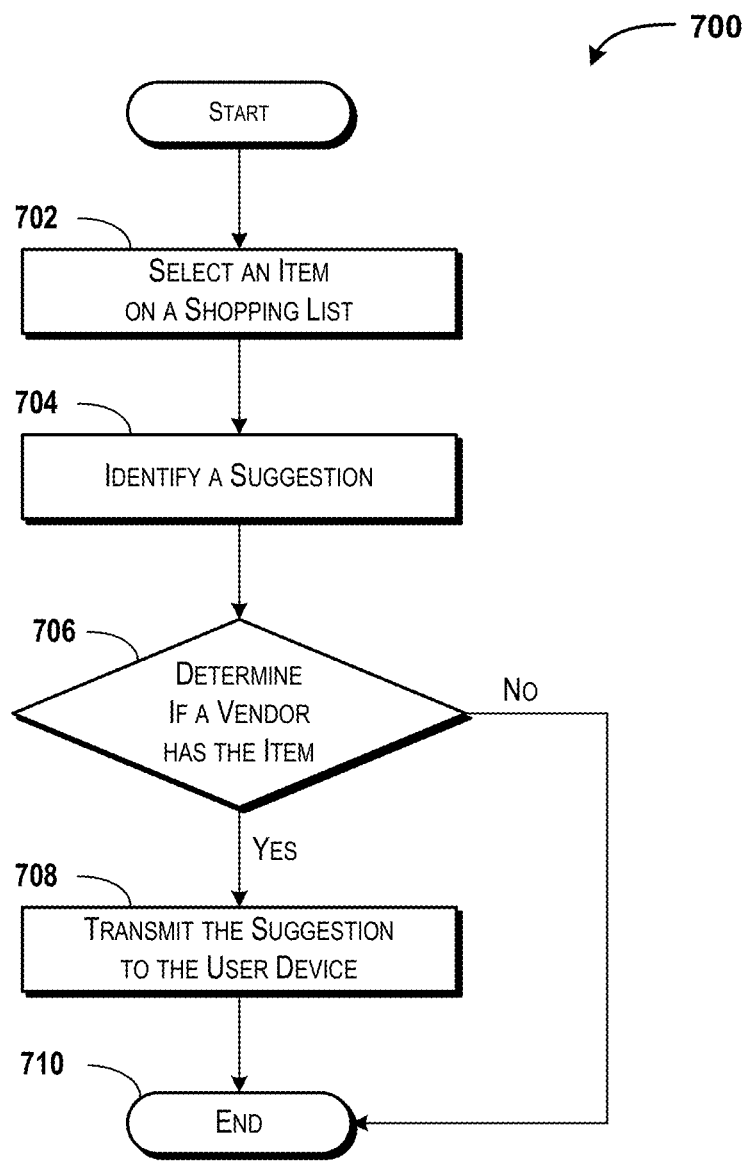
FIG. 7 is a flow diagram showing aspects of a method for generating shopping list suggestions based upon vendor inventories, according to another illustrative embodiment.

Turning now to FIG. 7, aspects of a method 700 for generating shopping list suggestions based upon vendor inventories will be described in detail, according to an illustrative embodiment. The method 700 begins at operation 702, wherein the server computer 114 selects an item on a shopping list. According to various embodiments, the server computer 114 can select a first item on the shopping list and analyze each item one after the other. According to another embodiment, the server computer 114 can select an item on the shopping list at random and continue randomly selecting items on the shopping list until each item on the shopping list has been considered. According to other embodiments, the shopping list items can be considered according to other orders specified or determined by the server computer 114.

From operation 702, the method 700 proceeds to operation 704, wherein the server computer 114 can identify a suggestion. In operation 704, the server computer 114 can identify an item to suggest to the user based upon, among other things, the item selected in operation 702 and one or more other considerations. The other considerations can include, for example, a purchase history of the user, rules that define relationships between items, combinations thereof, or the like. For example, if the item selected in operation 702 is "mustard," the server computer 114 can identify the suggestion as "ketchup."

In one embodiment, the server computer 114 identifies the suggestions, for example, by accessing a rule that suggests that buyers purchasing mustard often purchase ketchup as well. In another embodiment, the server computer 114 identifies the suggestions, for example, by accessing a purchase history associated with the user, wherein the purchasing history indicates that the user often purchases mustard and ketchup together. Because the suggestions can be identified in additional ways, it should be understood that these embodiments are illustrative, and should not be construed as being limiting in any way.

From operation 704, the method 700 proceeds to operation 706, wherein the server computer 114 determines if a vendor has the suggested item in its inventory. In particular, the server computer 114 can generate and/or retrieve a vendor list associated with a shopping list. The vendor list can include vendors that are to be visited in a shopping excursion to obtain items in the shopping list. Thus, the vendor list can be generated as part of and/or based upon a navigation route generated based upon a shopping list as described herein.

Thus, the server computer 114 can determine, in operation 706, if a vendor included in the vendor list has the item in its inventory. Thus, though not explicitly shown in FIG. 7, the server computer 114 can identify a vendor included in the vendor list and search its inventory for the item identified as a suggestion in operation 704. If the vendor does not have the suggested item, a next vendor can be selected and its inventory searched for the suggested item. The server computer 114 can repeat these operations in operation 706 until the server computer 114 determines that one or more of the vendors has the suggested item and/or that none of the vendors has the suggested item.

If the server computer 114 determines, in operation 706, that one or more vendors has the suggested item, the method 700 can proceed to operation 708. In operation 708, the server computer 114 can transmit an indication of the suggested item to the user device 102. Thus, for example, the server computer 114 can generate a suggestion 130 as shown in FIG. 1 and transmit the suggestion 130 to the user device 102.

From operation 708, the method 700 proceeds to operation 710. The method 700 also can proceed to operation 710 if the server computer 114 determines, in operation 706, that one or more vendors do not have the suggested item in their associated inventories. The method 700 ends at operation 710.

As such, it can be appreciated that by executing the method 700, the server computer 114 can be configured to examine each item on a list and determine if any suggestions 130 are to be generated and/or provided to the user device 102. Upon identifying a suggested item, the server computer 114 can determine if any vendors to be visited during shopping excursion have the item in their inventories. If so, the suggestion 130 can be pushed to the user device 102 and/or other entities for a decision as to whether or not the suggestion 130 is to be added to the shopping list. If not, the suggestions 130 can be deleted.

Although not shown in FIG. 7, the suggestions 130 can be provided to the user device 102, as mentioned above. The user or other entity at the user device 102 can consider the suggestions 130 and accept or reject the suggestions 130. If accepted, the list and route can be updated. If rejected, the list/route may not be updated.

Figure 8A:
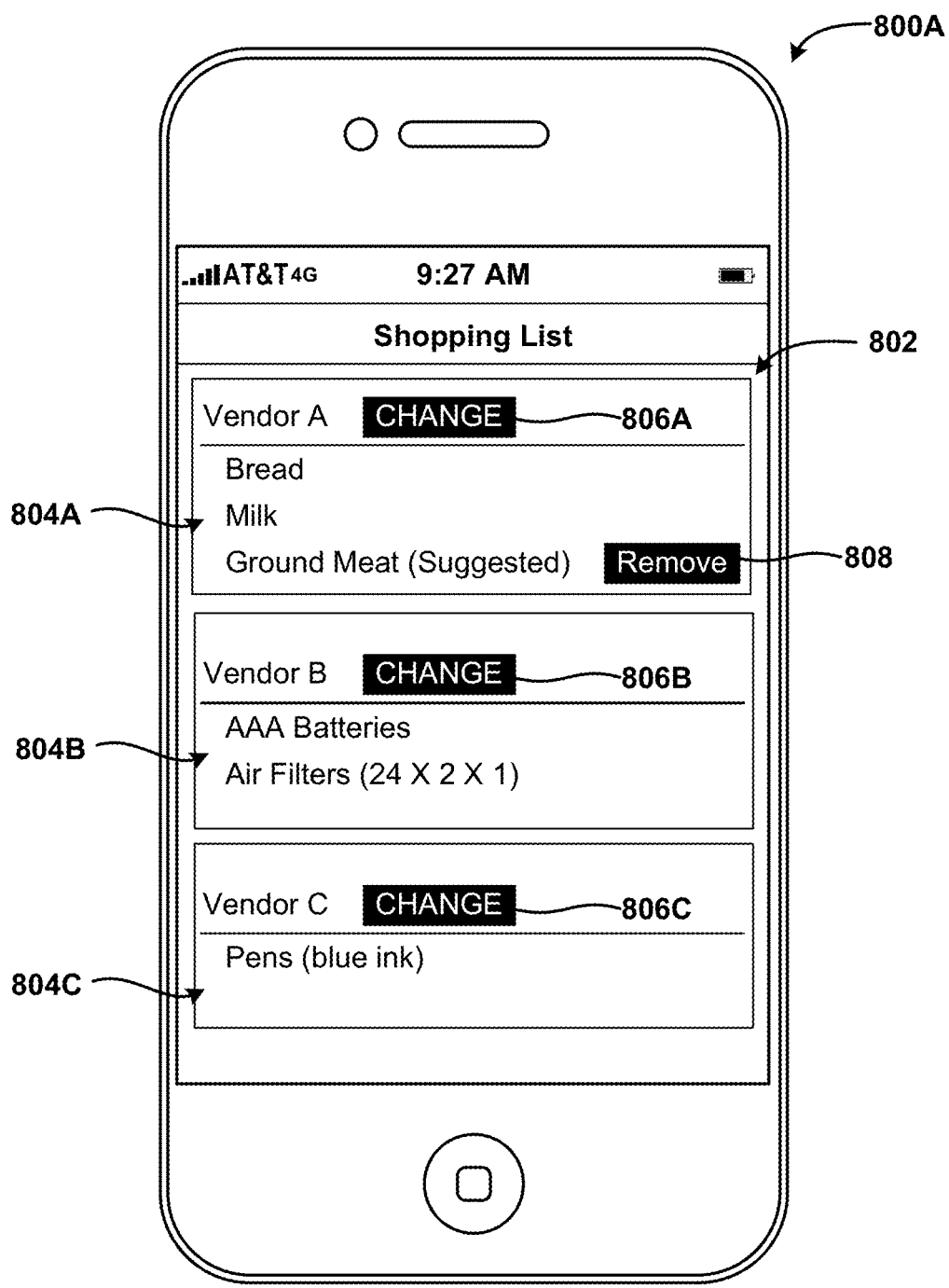
FIGS. 8A-8F are user interface ("UI") diagrams showing aspects of UIs for managing vendor inventory information and shopping navigation routes based upon shopping list contents, according to some illustrative embodiments.

Turning now to FIGS. 8A-8F, UI diagrams showing various aspects of the concepts and technologies disclosed herein for managing vendor inventory information and shopping navigation routes based upon shopping list contents will be described according to various illustrative embodiments. FIG. 8A shows an illustrative screen display 800A generated by a device such as the user device 102. According to various embodiments, the user device 102 can generate the screen display 800A and/or other screen displays in conjunction with and/or based upon data received from the shopping application 108, the shopping management service 116, the route management application 122, and/or other devices or systems as described herein. It should be appreciated that the UI diagram illustrated in FIG. 8A is illustrative of one contemplated embodiment, and therefore should not be construed as being limiting in any way.

Although not shown in FIG. 8A, the screen display 800A can include various menus and/or menu options such as options for exiting a current application or screen, accessing application preferences, and/or other options. It also should be understood that the screen display 800A and/or other screen displays can be provided at almost any time during operation of the user device 102. In FIG. 8A, the user device 102 is illustrated as displaying a user interface for viewing and/or modifying a shopping list. The screen display 800A can include a shopping list screen 802 for displaying and modifying a location-based shopping list.

In the embodiment shown in FIG. 8A, the shopping list screen 802 includes a number of vendor-specific shopping list fields 804A-C (hereinafter collectively and/or generically referred to as "shopping list fields 804"). The shopping list fields 804 can show portions of a shopping list specific to each vendor at which a user is to stop during a shopping excursion. In the illustrated example, three shopping list fields 804 are illustrated, corresponding to three stops to be made during a shopping excursion. In each of the shopping list fields 804, items specific to the vendors associated with the shopping list fields 804 can be listed. As such, a user can, at a glance, identify items to be purchased at each of the identified vendors.

The shopping list screen 802 also includes UI controls 806A-C (hereinafter collectively and/or generically referred to as "UI controls 806") for changing a vendor associated with each of the shopping list fields 804. Thus, for example, if a user wishes to avoid the vendor "Vendor B" associated with the shopping list field 804B, the user can select the UI control 806B to view a list of vendors near the user's location having the items in the shopping list field 804B in their inventories. Thus, a user can select a new vendor for various reasons. It should be understood that this embodiment is illustrative, and should not be construed as being limiting in any way.

The shopping list screen 802 also can include a UI control 808 for removing a suggested item. As explained above, suggestions can be pushed to the user device 102 and added to a shopping list, if desired. In some embodiments, the pushed suggestions 130 can appear on the shopping list screen 802 unless removed by a user. In some other embodiments, the suggestions 130 can be added to the shopping list screen 802 by a user, if desired. It can be appreciated with reference to FIG. 8A that a user can see a graphical representation of a shopping list, divided in accordance with determined shopping route. Because additional or alternative fields and/or UI controls can be included in the screen display 800A, and/or because additional or alternative actions can be taken in response to selection of the UI controls 806, 808 included in the screen display 800A, it should be understood that the illustrated embodiment shown in FIG. 8A is illustrative, and should not be construed as being limiting in any way.

Figure 8B:
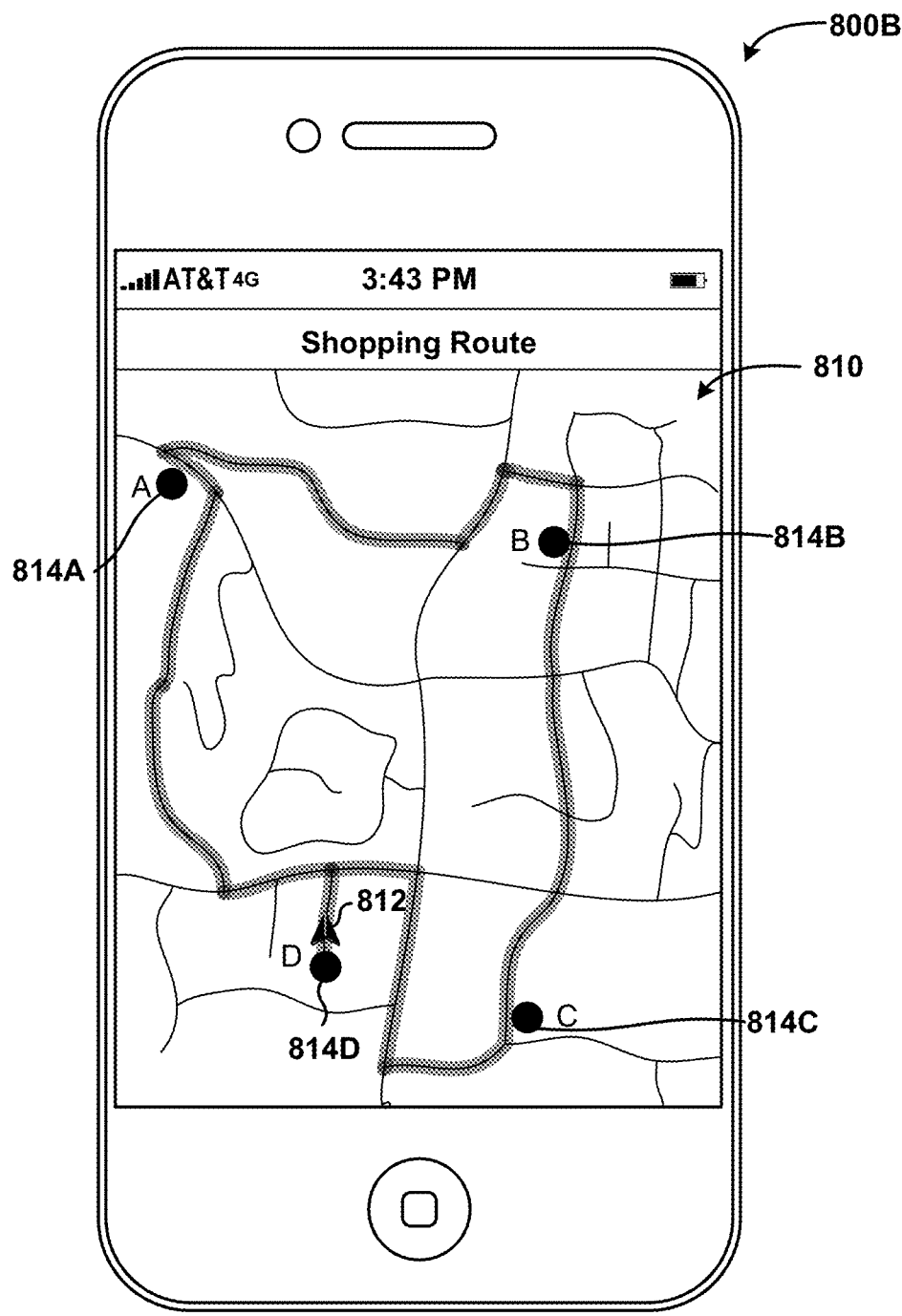

Referring now to FIG. 8B, a UI diagram showing additional aspects of the concepts and technologies disclosed herein for managing vendor inventory information and shopping navigation routes based upon shopping list contents are described in detail. In particular, FIG. 8B shows a screen display 800B generated by a device such as the user device 102. In some embodiments, the screen display 800B can be generated by the user device 102 in response to receiving a request to display a shopping route. According to some other embodiments, the screen display 800B can be generated by the user device 102 in response to detecting a tap, touch, gesture, keystroke, voice command, or other input for accessing a shopping route, or the like. Because the screen display 800B can be presented at additional and/or alternative times, it should be understood that these embodiments are illustrative, and should not be construed as being limiting in any way.

The screen display 800B can include a shopping route display 810 for displaying a shopping route and associated navigation directions for a user. Because navigation route displays such as that shown in FIG. 8B generally are understood, not all aspects of the shopping route display 810 are described herein in detail. The shopping route display 810 includes a current location indicator 812 and three shopping stop indicators 814A-D (hereinafter collectively and/or generically referred to as "shopping stop indicators 814"). Of course, the shopping route display 810 can include more than three, three, or less than three shopping stop indicators 814, and as such, it should be understood that this embodiment is illustrative, and should not be construed as being limiting in any way.

The three shopping stop indicators 814A-C illustrated in FIG. 8B can correspond to the three vendors illustrated in the shopping list screen 802 illustrated and described above with reference to FIG. 8A. The shopping stop indicator 814D can correspond to a home, business, or other final destination of the user. As shown in FIG. 8B, the shopping route display 810 can show a determined route for the shopping excursion. The route can take into account one or more routing constraints, as explained above with reference to FIGS. 1-7. It should be understood that this embodiment is illustrative, and should not be construed as being limiting in any way.

Figure 8C:
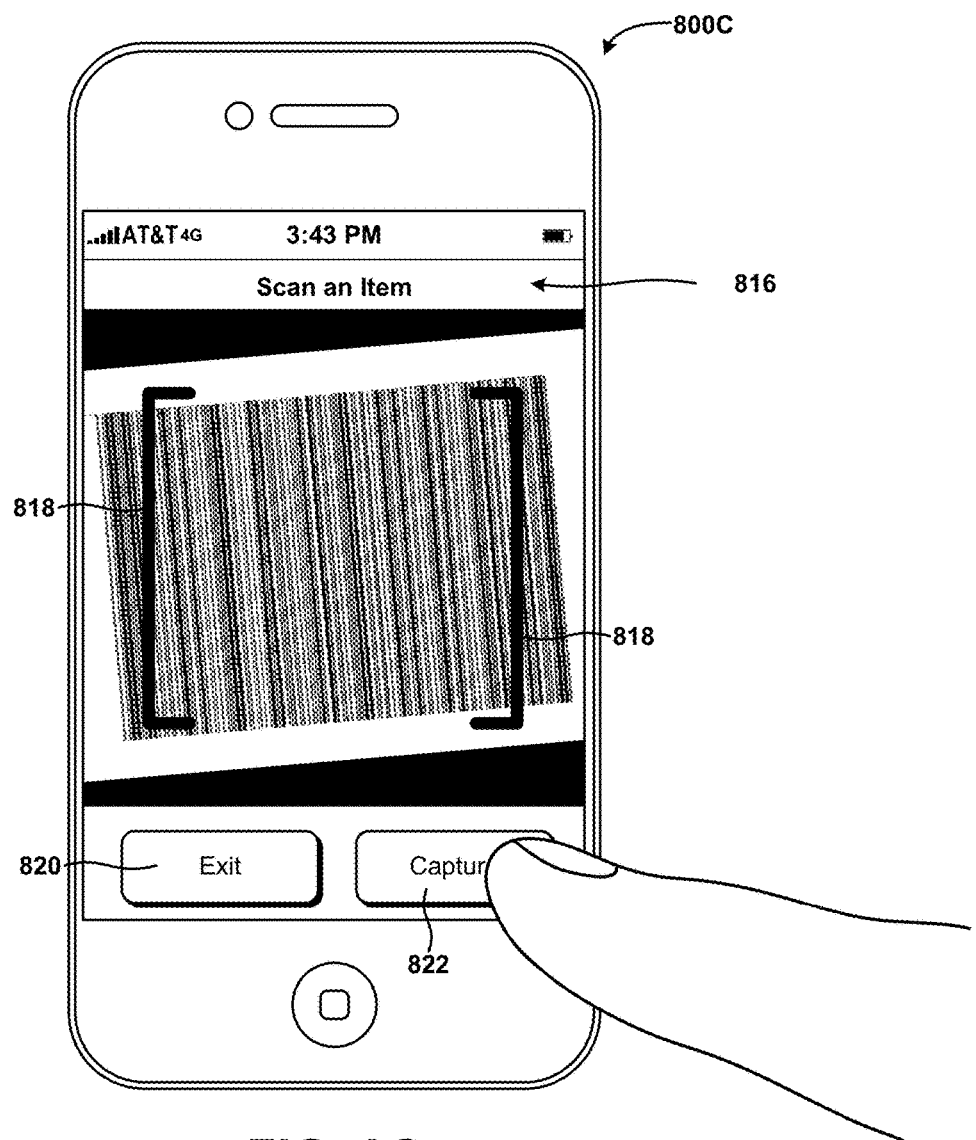

Turning now to FIG. 8C, the user device 102 is illustrated as displaying a user interface for capturing or scanning an item barcode or other identifier. As explained above, a user can scan purchased items during the shopping excursion to remove the items from the shopping list, to update an inventory associated with a vendor, and/or for other reasons. As shown in FIG. 8C, the shopping application 108 can access an imaging device of the user device 102 and display data captured with the imaging device on a screen display for a user or other entity. Thus, the user device 102 can be configured to guide a user through a scan process and/or other operations for capturing a barcode or other item identifier. Although not shown in FIG. 8C, it should be understood that near field communications, infrared, RFID, and/or other communications technologies can be used to capture the information identifying an item instead of, or in addition to, using an image capture device as illustrated in FIG. 8C.

It can be appreciated from the description of FIG. 3 above that the screen display 800C illustrated in FIG. 8C can be, but is not necessarily, used to guide a user through generating an indication that an item has been purchased, as described with reference to operations 502 and 602 of the methods 500-600 illustrated in FIGS. 5-6. The screen display 800C can include a shopping list scan screen 816. The shopping list scan screen 816 can include text, graphics, and/or other information that explains or guides a user or other entity through capturing information for identifying an item on a shopping list.

As shown in FIG. 8C, though not necessarily included in all embodiments, the shopping list scan screen 816 can include one or more visual guides 818 for guiding a user or other entity. Thus, the screen display 800C can help a user orient the user device 102 in or at an orientation and/or position at which a barcode, tag, label, or other surface bearing indicia can be captured or scanned. The screen display 800C also can include a UI control 820 for exiting the shopping list scan screen 816. The screen display 800C also can include a UI control 822 for scanning or capturing barcode, tag, label, or other information using the image system of the user device 102.

Thus, a user or other entity can, by way of interacting with the shopping list scan screen 816, exit or complete capturing or scanning of a barcode or other identifier associated with an item being purchased by a user of the user device 102. More particularly, selection of the UI control 820 can cause the user device 102 to close or exit the shopping list scan screen 816 and/or to cancel capturing or scanning of a barcode or other indicia. Because additional or alternative UI controls can be included in the screen display 800C, and/or because additional or alternative actions can be taken in response to selection of the UI controls 820, 822 included in the screen display 800C, it should be understood that these embodiments are illustrative, and should not be construed as being limiting in any way.

Figure 8D:
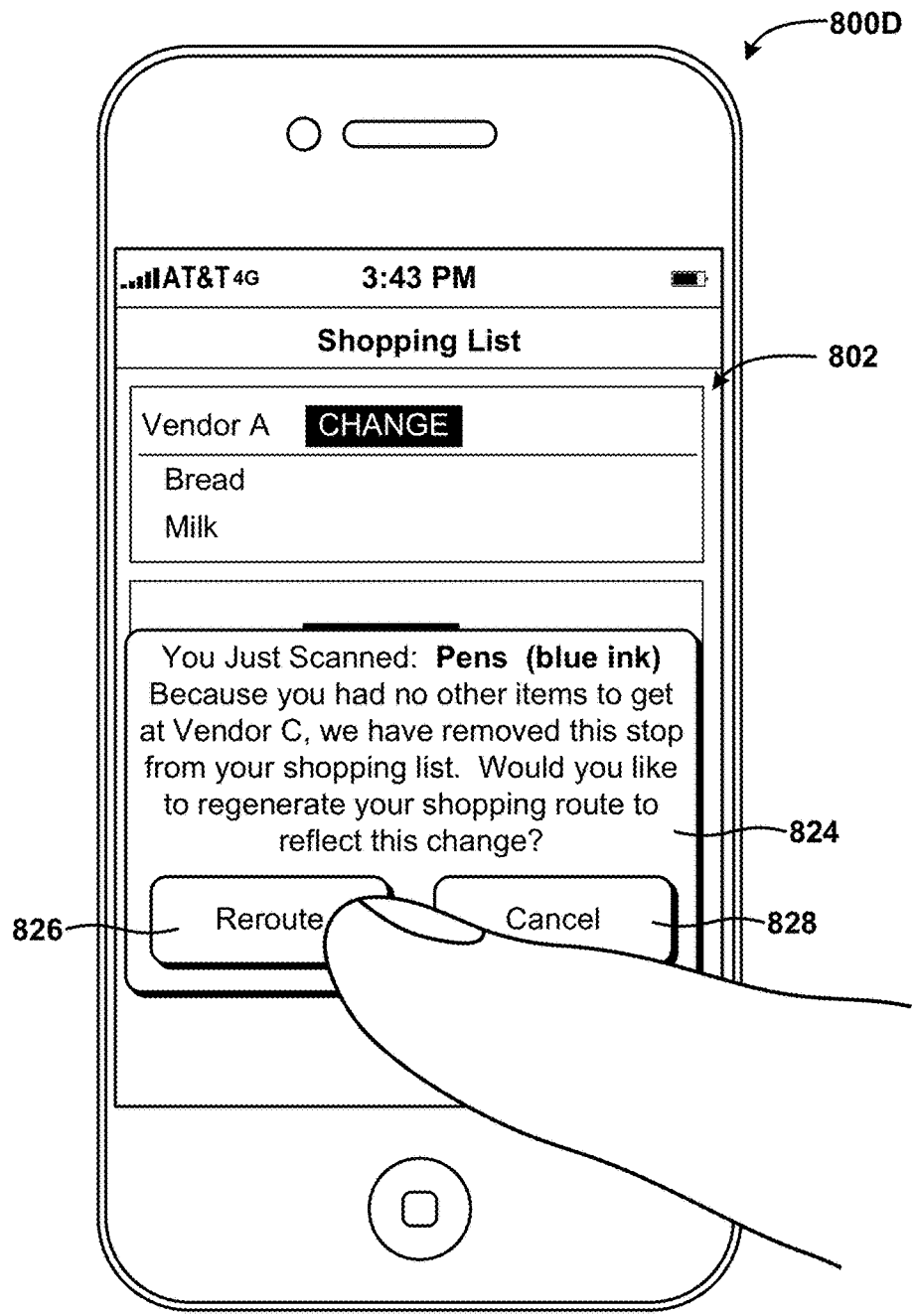

Referring now to FIG. 8D, a UI diagram showing additional aspects of the concepts and technologies disclosed herein for managing vendor inventory information and shopping navigation routes based upon shopping list contents are described in detail. In particular, FIG. 8D shows a screen display 800D generated by a device such as the user device 102. In some embodiments, the screen display 800D can be generated by the user device 102 in response to detecting that an item in the shopping list has been scanned, for example via interactions with the screen display 800C illustrated in FIG. 8C. Because the screen display 800D can be presented at additional and/or alternative times, it should be understood that these embodiments are illustrative, and should not be construed as being limiting in any way.

The screen display 800D can display the shopping list screen 802 described above with reference to FIG. 8A. Although not visible in FIG. 8D, it should be understood that the contents of the shopping list can be updated to reflect a scanned item. In the illustrated example, a user or other entity has scanned blue pens. Thus, the blue pens visible in the shopping list screen 802 in FIG. 8A may have been removed. As shown in FIG. 8D, the user device 102 can prompt a user to confirm that a shopping stop associated with the vendor "Vendor C" at which the blue pens were to be purchased can be removed from a shopping route. In some embodiments, the user device 102 can present a shopping list update window 824. It should be understood that this embodiment is illustrative, and should not be construed as being limiting in any way.

As shown in FIG. 8D, the shopping list update window 824 can inform a user that an item has been scanned, and that because this item has been purchased, a stop at one or more vendors previously indicated due to the shopping list contents has been eliminated. Furthermore, although not visible in FIG. 8D, data indicating the purchase of the item can be provided to a shopping management service for updating inventory data and/or for other reasons. As shown in FIG. 8D, the shopping list update window 824 also can prompt a user to request rerouting or recalculation of the shopping route in response to detecting a purchase of an item that previously was to necessitate a shopping stop. The shopping list update window 824 can include a UI control 826 for requesting rerouting and/or a route update. The shopping list update window 824 also can include a UI control 828 for cancelling rerouting. Thus, the screen display 800D can be interacted with to update a shopping list and/or a shopping route as described above with reference to FIGS. 5-6.

Figure 8E:
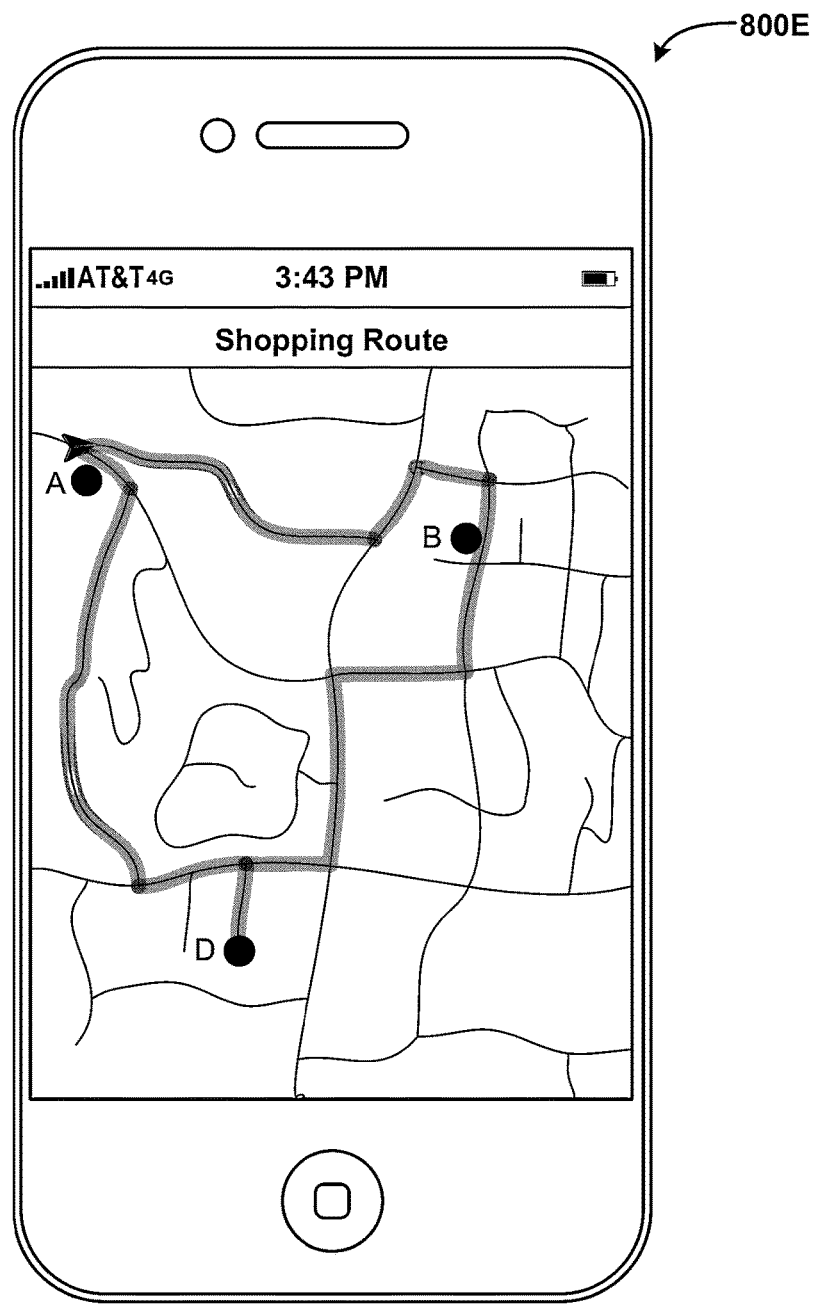

In response to detecting selection of the UI control 826 for rerouting the user, the user device 102 can request and obtain a navigation route update and present an updated shopping route, as shown in FIG. 8E. In FIG. 8E, the stop 814C associated with the vendor "Vendor C" has been removed to reflect purchase of the blue pens as illustrated and described above. It should be understood that this embodiment is illustrative, and should not be construed as being limiting in any way.

Figure 8F:
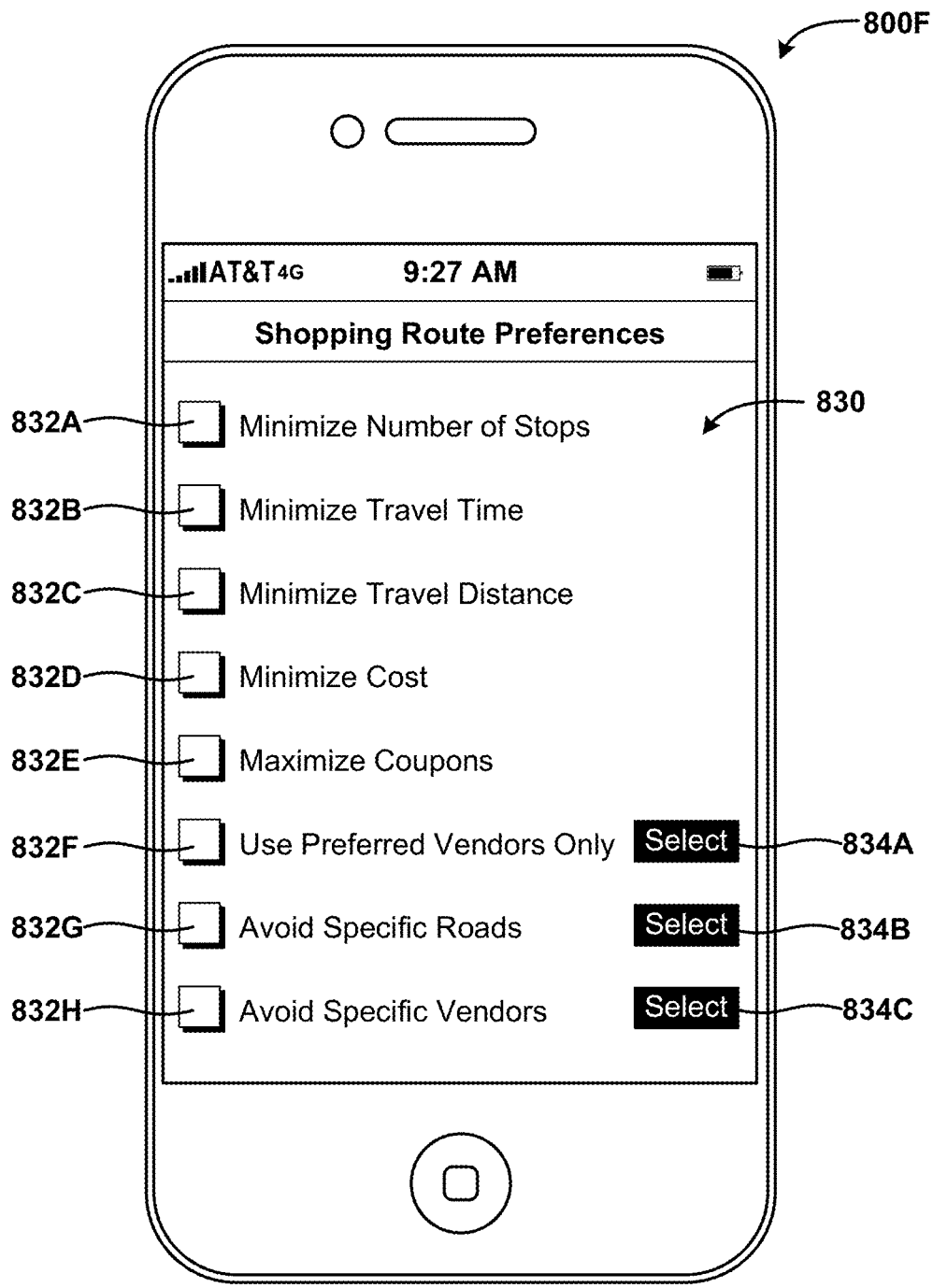

Referring now to FIG. 8F, a UI diagram showing additional aspects of the concepts and technologies disclosed herein for managing vendor inventory information and shopping navigation routes based upon shopping list contents are described in detail. In particular, FIG. 8F shows a screen display 800F generated by a device such as the user device 102 for setting one or more shopping route preferences to be used in generating shopping routes as described herein. The screen display 800F can be generated by the user device 102 in response to detecting a command to view settings, options, preferences, and/or the like associated with the shopping application 108. Because the screen display 800F can be presented at additional and/or alternative times, it should be understood that these embodiments are illustrative, and should not be construed as being limiting in any way.

The screen display 800F can display a shopping route preferences screen 830. The shopping route preferences screen 830 can include UI controls 832A-H (hereinafter collectively and/or generically referred to as "UI controls 832") for selecting and/or deselecting routing constraints. It should be understood that the illustrated routing constraints are illustrative of only some contemplated example routing constraints. As such, the illustrated embodiment should not be construed as being limiting in any way. The shopping route preferences screen 830 also can include UI controls 834A-C for specifying particular vendors or roads associated with the UI controls 832F-H described above. Thus, by interacting with the screen display 800F, a user can specify particular routing constraints to be used to identify vendors and/or generate a shopping route for items in a shopping list based upon options and/or preferences of a user. It should be understood that this embodiment is illustrative, and should not be construed as being limiting in any way.

Figure 9:
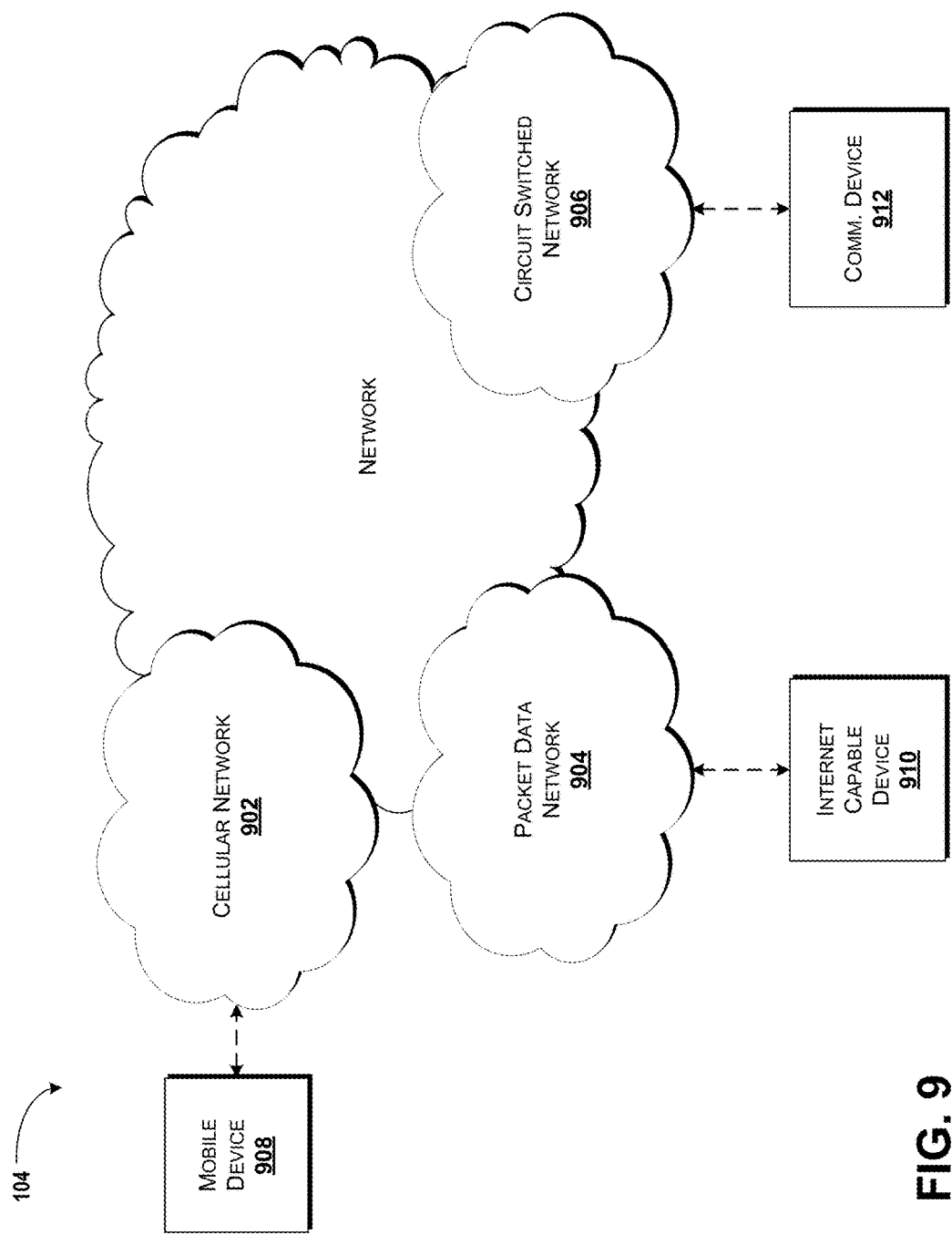
FIG. 9 schematically illustrates a network, according to an illustrative embodiment.

Turning now to FIG. 9, additional details of the network 104 are illustrated, according to an illustrative embodiment. The network 104 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system (POTS). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 104 is used to refer broadly to any combination of the networks 902, 904, 906. It should be appreciated that substantially all of the functionality described with reference to the network 104 can be performed by the cellular network 902, the packet data network 904, and/or the circuit switched network 906, alone or in combination with other networks, network elements, and the like.

Figure 10:
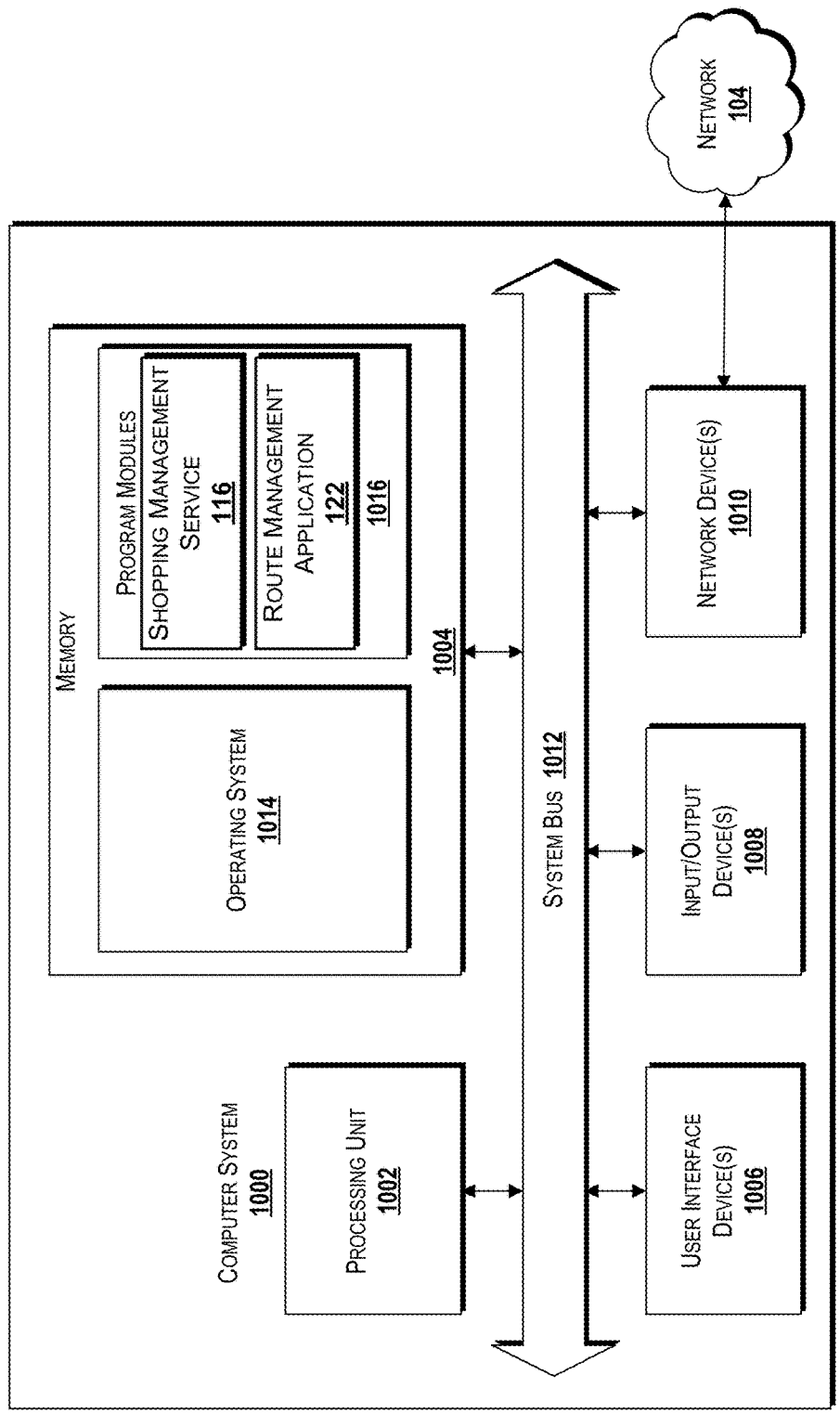
FIG. 10 is a block diagram illustrating an example computer system configured to managing vendor inventory information and shopping navigation routes based upon shopping list contents, according to some illustrative embodiments.

FIG. 10 is a block diagram illustrating a computer system 1000 configured to provide the functionality described herein for managing vendor inventory information and shopping navigation routes based upon shopping list contents, in accordance with various embodiments of the concepts and technologies disclosed herein. The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1016 may include various software and/or program modules described herein. In some embodiments, for example, the program modules 1016 include the shopping management service 116 and/or the route management application 122. This and/or other programs can be embodied in computer-readable media containing instructions that, when executed by the processing unit 1002, perform one or more of the methods 200-700 described in detail above with respect to FIGS. 2-7. According to embodiments, the program modules 1016 may be embodied in hardware, software, firmware, or any combination thereof. Although not shown in FIG. 10, it should be understood that the memory 1004 also can be configured to store the application data 118, the data 112, the route data 124, the updates 126, the requests 128, the suggestions 130, and/or other data, if desired.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network, such as the network 104. Examples of the network devices 1010 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 11:
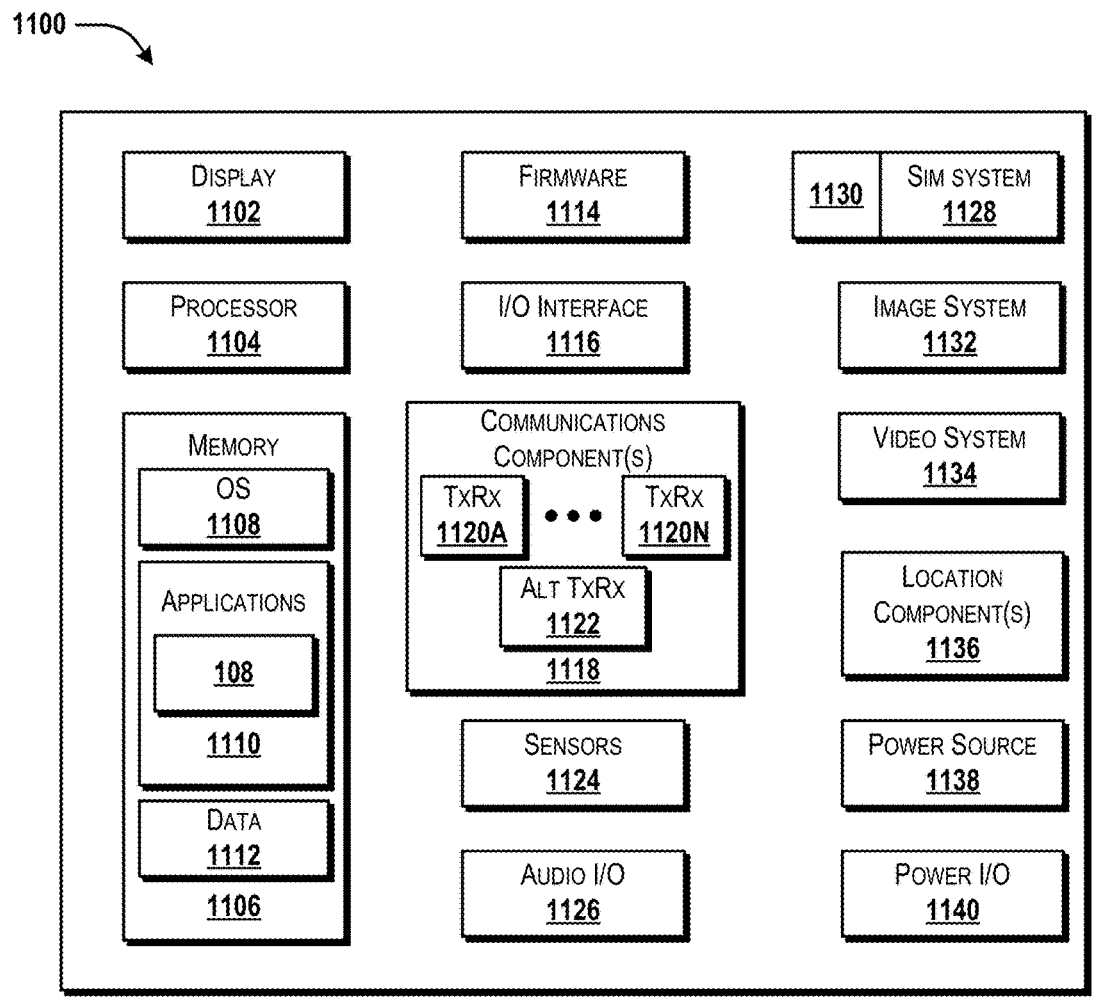
FIG. 11 is a block diagram illustrating an example mobile device configured to interact with a shopping management service and a route management application, according to some illustrative embodiments.

Turning now to FIG. 11, an illustrative mobile device 1100 and components thereof will be described. In some embodiments, the user device 102 described above with reference to FIGS. 1-8F can be configured as and/or can have an architecture similar or identical to the mobile device 1100 described herein in FIG. 11. It should be understood, however, that the user device 102 may or may not include the functionality described herein with reference to FIG. 11. As used in the claims, the phrase "user device" and variants thereof is used to refer to a device having at least a processor, a memory, an image system, a location component, a display screen, and networking capabilities described herein. While connections are not shown between the various components illustrated in FIG. 11, it should be understood that some, none, or all of the components illustrated in FIG. 11 can be configured to interact with one other to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

As illustrated in FIG. 11, the mobile device 1100 can include a display 1102 for displaying data. According to various embodiments, the display 1102 can be configured to display asset information, asset tag or asset ID information, asset management account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1100 also can include a processor 1104 and a memory or other data storage device ("memory") 1106. The processor 1104 can be configured to process data and/or can execute computer-executable instructions stored in the memory 1106. The computer-executable instructions executed by the processor 1104 can include, for example, an operating system 1108, one or more applications 1110 such as the shopping application 108, other computer-executable instructions stored in a memory 1106, or the like. In some embodiments, the applications 1110 also can include a UI application (not illustrated in FIG. 11).

The UI application can interface with the operating system 1108, such as the operating system 106 shown in FIG. 1, to facilitate user interaction with functionality and/or data stored at the mobile device 1100 and/or stored elsewhere. In some embodiments, the operating system 1108 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1104 to aid a user in entering content, scanning or capturing asset ID or asset tag information, creating new asset tags or asset ID numbers, viewing asset information and/or account information, answering/initiating calls, entering/deleting data, entering and setting user IDs and passwords for device access, configuring settings, manipulating address book content and/or settings, multimode interaction, interacting with other applications 1110, and otherwise facilitating user interaction with the operating system 1108, the applications 1110, and/or other types or instances of data 1112 that can be stored at the mobile device 1100. The data 1112 can include, for example, asset information, asset tags and/or asset identifiers, and/or other applications or program modules. According to various embodiments, the data 1112 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1110, the data 1112, and/or portions thereof can be stored in the memory 1106 and/or in a firmware 1114, and can be executed by the processor 1104. The firmware 1114 also can store code for execution during device power up and power down operations. It can be appreciated that the firmware 1114 can be stored in a volatile or non-volatile data storage device including, but not limited to, the memory 1106 and/or a portion thereof.

The mobile device 1100 also can include an input/output ("I/O") interface 1116. The I/O interface 1116 can be configured to support the input/output of data such as location information, asset information, user information, organization information, presence status information, user IDs, passwords, and application initiation (start-up) requests. In some embodiments, the I/O interface 1116 can include a hardware connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1100 can be configured to synchronize with another device to transfer content to and/or from the mobile device 1100. In some embodiments, the mobile device 1100 can be configured to receive updates to one or more of the applications 1110 via the I/O interface 1116, though this is not necessarily the case. In some embodiments, the I/O interface 1116 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1116 may be used for communications between the mobile device 1100 and a network device or local device.

The mobile device 1100 also can include a communications component 1118. The communications component 1118 can be configured to interface with the processor 1104 to facilitate wired and/or wireless communications with one or more networks such as the network 104 described herein. In some embodiments, other networks include networks that utilize non-cellular wireless technologies such as WI-FI or WIMAX. In some embodiments, the communications component 1118 includes a multimode communications subsystem for facilitating communications via the cellular network and one or more other networks.

The communications component 1118, in some embodiments, includes one or more transceivers. The one or more transceivers, if included, can be configured to communicate over the same and/or different wireless technology standards with respect to one another. For example, in some embodiments one or more of the transceivers of the communications component 1118 may be configured to communicate using GSM, CDMAONE, CDMA2000, LTE, and various other 2G, 2.5G, 3G, 4G, and greater generation technology standards. Moreover, the communications component 1118 may facilitate communications over various channel access methods (which may or may not be used by the aforementioned standards) including, but not limited to, TDMA, FDMA, W-CDMA, OFDM, SDMA, and the like.

In addition, the communications component 1118 may facilitate data communications using GPRS, EDGE, the HSPA protocol family including HSDPA, EUL or otherwise termed HSUPA, HSPA+, and various other current and future wireless data access standards. In the illustrated embodiment, the communications component 1118 can include a first transceiver ("TxRx") 1120A that can operate in a first communications mode (e.g., GSM). The communications component 1118 also can include an $N^{th}$ transceiver ("TxRx") 1120N that can operate in a second communications mode relative to the first transceiver 1120A (e.g., UMTS). While two transceivers 1120A-N (hereinafter collectively and/or generically referred to as "transceivers 1120") are shown in FIG. 11, it should be appreciated that less than two, two, and/or more than two transceivers 1120 can be included in the communications component 1118.

The communications component 1118 also can include an alternative transceiver ("Alt TxRx") 1122 for supporting other types and/or standards of communications. According to various contemplated embodiments, the alternative transceiver 1122 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1118 also can facilitate reception from terrestrial radio networks, digital satellite radio networks, internet-based radio service networks, combinations thereof, and the like. The communications component 1118 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1100 also can include one or more sensors 1124. The sensors 1124 can include temperature sensors, light sensors, air quality sensors, movement sensors, orientation sensors, noise sensors, proximity sensors, or the like. As such, it should be understood that the sensors 1124 can include, but are not limited to, accelerometers, magnetometers, gyroscopes, infrared sensors, noise sensors, microphones, combinations thereof, or the like. Additionally, audio capabilities for the mobile device 1100 may be provided by an audio I/O component 1126. The audio I/O component 1126 of the mobile device 1100 can include one or more speakers for the output of audio signals, one or more microphones for the collection and/or input of audio signals, and/or other audio input and/or output devices.

The illustrated mobile device 1100 also can include a subscriber identity module ("SIM") system 1128. The SIM system 1128 can include a universal SIM ("USIM"), a universal integrated circuit card ("UICC") and/or other identity devices. The SIM system 1128 can include and/or can be connected to or inserted into an interface such as a slot interface 1130. In some embodiments, the slot interface 1130 can be configured to accept insertion of other identity cards or modules for accessing various types of networks. Additionally, or alternatively, the slot interface 1130 can be configured to accept multiple subscriber identity cards. Because other devices and/or modules for identifying users and/or the mobile device 1100 are contemplated, it should be understood that these embodiments are illustrative, and should not be construed as being limiting in any way.

The mobile device 1100 also can include an image capture and processing system 1132 ("image system"). The image system 1132 can be configured to capture or otherwise obtain photos, videos, and/or other visual information. As such, the image system 1132 can include cameras, lenses, charge-coupled devices ("CCDs"), combinations thereof, or the like. The mobile device 1100 may also include a video system 1134. The video system 1134 can be configured to capture, process, record, modify, and/or store video content. Photos and videos obtained using the image system 1132 and the video system 1134, respectively, may be added as message content to an MMS message, email message, and sent to another mobile device. The video and/or photo content also can be shared with other devices via various types of data transfers via wired and/or wireless communication devices as described herein.

The mobile device 1100 also can include one or more location components 1136. The location components 1136 can be configured to send and/or receive signals to determine a geographic location of the mobile device 1100. According to various embodiments, the location components 1136 can send and/or receive signals from global positioning system ("GPS") devices, assisted-GPS ("A-GPS") devices, WI-FI/WIMAX and/or cellular network triangulation data, combinations thereof, and the like. The location component 1136 also can be configured to communicate with the communications component 1118 to retrieve triangulation data for determining a location of the mobile device 1100. In some embodiments, the location component 1136 can interface with cellular network nodes, telephone lines, satellites, location transmitters and/or beacons, wireless network transmitters and receivers, combinations thereof, and the like. In some embodiments, the location component 1136 can include and/or can communicate with one or more of the sensors 1124 such as a compass, an accelerometer, and/or a gyroscope to determine the orientation of the mobile device 1100. Using the location component 1136, the mobile device 1100 can generate and/or receive data to identify its geographic location, or to transmit data used by other devices to determine the location of the mobile device 1100. The location component 1136 may include multiple components for determining the location and/or orientation of the mobile device 1100.

The illustrated mobile device 1100 also can includes a power source 1138. The power source 1138 can include one or more batteries, power supplies, power cells, and/or other power subsystems including alternating current ("AC") and/or direct current ("DC") power devices. The power source 1138 also can interface with an external power system or charging equipment via a power I/O component 1140. Because the mobile device 1100 can include additional and/or alternative components, the above embodiment should be understood as being illustrative of one possible operating environment for various embodiments of the concepts and technologies described herein. The described embodiment of the mobile device 1100 is illustrative, and should not be construed as being limiting in any way.

Based on the foregoing, it should be appreciated that systems and methods for managing vendor inventory information and shopping navigation routes based upon shopping list contents have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
providing, by a user device comprising a global positioning system receiver and a computer processor that executes a shopping application, shopping list data that represents a shopping list to a server computer via a network, wherein the shopping list comprises a first item and a second item;
determining, by the user device and using the global positioning system receiver, a geographic location of the user device;
providing, by the user device and to the server computer via the network, location data that indicates the geographic location of the user device, wherein the server computer identifies, based upon the location data and the shopping list, a first vendor that has a first inventory that comprises the first item and a second vendor that has a second inventory that comprises the second item;
receiving, by the user device and from the server computer via the network, a suggestion comprising a third item that is related to the first item, wherein the third item is identified by the server computer based on a purchase history associated with the user device, wherein the server computer searches the first inventory and the second inventory and verifies that the first inventory or the second inventory comprises the third item, and wherein the third item is added to the shopping list via the suggestion, wherein the suggestion results in the third item being added to the shopping list until the third item is removed;
presenting, at the user device, a shopping list screen that indicates that the third item has been added to the shopping list, wherein the shopping list screen comprises a first option to remove the third item from the shopping list;
receiving, by the user device, a navigation route from the server computer via the network, the navigation route corresponding to a shopping excursion, wherein the navigation route begins at the geographic location of the user device, wherein the navigation route comprises a first stop at a first vendor location associated with the first vendor, and a second stop at a second vendor location associated with the second vendor, and wherein the server computer generates the navigation route based on shopping route preferences obtained via a user interface presented at the user device, the shopping route preferences comprising a second option to maximize coupons, a third option to use preferred vendors only, a fourth option to avoid a specific road, and a fifth option to avoid a specific vendor;
presenting, by the user device, a first route display comprising a map and the navigation route; determining, by the user device and during the shopping excursion, that the first item has been purchased at the first vendor, wherein determining that the first item has been purchased at the first vendor comprises detecting scanning of a barcode of the first item by a camera of the user device and determining, by detecting communications with a WiFi transmitter that is located at a vendor location associated with the first vendor, that the user device is located at the first vendor, wherein the shopping application is used to scan items as the items are purchased, wherein the scanning of the barcode indicates a purchase of the first item, and wherein the WiFi transmitter is identified by a service set identifier;
providing, by the user device and to the server computer via the network, data indicating that the first item has been purchased;
presenting, at the user device, a notification that the first item has been removed from the shopping list, wherein the notification is presented with a sixth option to change the navigation route;
determining, at the user device, that the navigation route is to be changed by detecting selection of the sixth option;
receiving, by the user device and from the server computer via the network, a navigation route update that removes the first vendor from the navigation route to create an updated navigation route; and
presenting, by the user device, a second route display comprising the map and the updated navigation route.

2. The method of claim 1, wherein the server computer identifies the first vendor by searching the first inventory via an application programming interface exposed by a computing device associated with the first vendor.

3. The method of claim 1, wherein the server computer updates inventory data associated with the first inventory to indicate that the item was purchased.

4. The method of claim 1, wherein the server computer identifies the first vendor and the second vendor by searching inventories of vendors within a geographic area that comprises the geographic location.

5. The method of claim 1, wherein determining that the first item has been purchased further comprises determining, based on the purchase history, that the first item has been purchased.

6. The method of claim 5, wherein the purchase history is based on history data obtained from a credit card processing company.

7. The method of claim 1, wherein presenting the notification that the first item has been removed from the shopping list comprises determining that one unit of the first item has been purchased, determining that two units of the first item were on the shopping list, and reducing a number of units of the first item on the shopping list from two units to one unit.

8. A user device comprising:
a computer processor;
a camera;
a global positioning system receiver; and
a memory that stores computer-executable instructions that, when executed by the computer processor, cause the computer processor to perform operations comprising
providing, via a network and to a server computer, shopping list data that represents a shopping list, wherein the shopping list comprises a first item and a second item;
determining, using the global positioning system receiver, a geographic location of the user device;
providing, via the network and to the server computer, location data that indicates the geographic location of the user device, wherein the server computer identifies, based upon the location information and the shopping list, a first vendor that has a first inventory that comprises the first item and a second vendor that has a second inventory that comprises the second item;

receiving, from the server computer and via the network, a suggestion comprising a third item that is related to the first item, wherein the third item is identified by the server computer based on a purchase history associated with the user device and a determination that the second inventory comprises the third item, wherein the server computer searches the first inventory and the second inventory and verifies that the first inventory or the second inventory comprises the third item, and wherein the third item is added to the shopping list via the suggestion, wherein the suggestion results in the third item being added to the shopping list until the third item is removed;

presenting a shopping list screen that indicates that the third item has been added to the shopping list, wherein the shopping list screen comprises a first option to remove the third item from the shopping list;

receiving a navigation route from the server computer via the network, the navigation route corresponding to a shopping excursion, wherein the navigation route begins at the geographic location of the user device, wherein the navigation route comprises a first stop at a first vendor location associated with the first vendor, and a second stop at a second vendor location associated with the second vendor, and wherein the server computer generates the navigation route based on shopping route preferences obtained via a user interface presented at the user device, the shopping route preferences comprising a second option to maximize coupons, a third option to use preferred vendors only, a fourth option to avoid a specific road, and a fifth option to avoid a specific vendor;

presenting a first route display comprising a map and the navigation route;

determining, that the first item has been purchased at the first vendor, wherein determining that the first item has been purchased at the first vendor comprises detecting scanning of a barcode of the first item by the camera and determining, by detecting communications with a WiFi transmitter that is located at a vendor location associated with the first vendor, that the user device is located at the first vendor, wherein the shopping application is used to scan items as the items are purchased, wherein the scanning of the barcode indicates a purchase of the first item, and wherein the WiFi transmitter is identified by a service set identifier;

providing, to the server computer and via the network, data indicating that the first item has been purchased;

presenting a notification that the first item has been removed from the shopping list, wherein the notification is presented with a sixth option to change the navigation route;

determining that the navigation route is to be changed by detecting selection of the sixth option;

receiving, from the server computer and via the network, a navigation route update that removes the first vendor from the navigation route to create an updated navigation route; and presenting a second route display comprising the map and the updated navigation route.

9. The user device of claim 8, wherein the server computer identifies the first vendor by searching the first inventory via an application programming interface exposed by a computing device associated with the first vendor.

10. The user device of claim 8, wherein determining that the first item has been purchased further comprises determining, based on the purchase history, that the first item has been purchased.

11. The user device of claim 10, wherein the purchase history is based on history data obtained from a credit card processing company.

12. The user device of claim 8, wherein presenting the notification that the first item has been removed from the shopping list comprises determining that one unit of the first item has been purchased, determining that two units of the first item were on the shopping list, and reducing a number of units of the first item on the shopping list from two units to one unit.

13. A non-transitory computer storage medium having computer-executable instructions stored thereon that, when executed by a computer processor, cause the computer processor to perform operations comprising:

providing, by a user device that comprises a global positioning system receiver and that executes a shopping application, shopping list data that represents a shopping list to a server computer via a network, wherein the shopping list comprises a first item and a second item;

determining, using the global positioning system receiver, a geographic location of the user device;

providing, via the network and to the server computer, location data that indicates the geographic location of the user device, wherein the server computer identifies, based upon the location data and the shopping list, a first vendor that has a first inventory that comprises the first item and a second vendor that has a second inventory that comprises the second item;

receiving, from the server computer and via the network, a suggestion comprising a third item that is related to the first item, wherein the third item is identified by the server computer based on a purchase history associated with the user device, wherein the server computer searches the first inventory and the second inventory and verifies that the first inventory or the second inventory comprises the third item, and wherein the third item is added to the shopping list via the suggestion, wherein the suggestion results in the third item being added to the shopping list until the third item is removed:

presenting a shopping list screen that indicates that the third item has been added to the shopping list, wherein the shopping list screen comprises a first option to remove the third item from the shopping list;

receiving a navigation route from the server computer via the network, the navigation route corresponding to a shopping excursion, wherein the navigation route begins at the geographic location of the user device, wherein the navigation route comprises a first stop at a first vendor location associated with the first vendor, and a second stop at a second vendor location associated with the second vendor, wherein the server computer generates the navigation route based on shopping route preferences obtained via a user interface presented at the user device, the shopping route preferences comprising a second option to maximize coupons, a third option to use preferred vendors only, a fourth option to avoid a specific road, and a fifth option to avoid a specific vendor;

presenting a first route display comprising a map and the navigation route;

determining that the first item has been purchased at the first vendor, wherein determining that the first item has been purchased at the first vendor comprises detecting scanning of a barcode of the first item by a camera of the user device and determining, by detecting communications with a WiFi transmitter that is located at a vendor location associated with the first vendor, that the user device is located at the first vendor, and wherein the shopping application is used to scan items as the items are purchased, wherein the scanning of the barcode indicates a purchase of the first item, and wherein the WiFi transmitter is identified by a service set identifier;

providing, to the server computer and via the network, data indicating that the first item has been purchased;

presenting a notification that the first item has been removed from the shopping list, wherein the notification is presented with a sixth option to change the navigation route;

determining that the navigation route is to be changed by detecting selection of the sixth option;

receiving, from the server computer and via the network, a navigation route update that removes the first vendor from the navigation route to create an updated navigation route; and presenting, by the user device, a second route display comprising the map and the updated navigation route.

14. The non-transitory computer storage medium of claim 13, wherein the server computer identifies the first vendor by searching the first inventory via an application programming interface exposed by a computing device associated with the first vendor.

15. The non-transitory computer storage medium of claim 13, wherein determining that the first item has been purchased further comprises determining, based on the purchase history, that the first item has been purchased.

16. The non-transitory computer storage medium of claim 15, wherein the purchase history is based on history data obtained from a credit card processing company.

17. The non-transitory computer storage medium of claim 13, wherein presenting a notification that the first item has been removed from the shopping list comprises determining that one unit of the first item has been purchased, determining that two units of the first item were on the shopping list, and reducing a number of units of the first item on the shopping list from two units to one unit.

* * * * *